(12) United States Patent
Son et al.

(10) Patent No.: US 9,873,372 B2
(45) Date of Patent: Jan. 23, 2018

(54) ADAPTIVE DRIVING BEAM HEADLAMP FOR VEHICLE

(71) Applicant: SL Corporation, Daegu (KR)

(72) Inventors: Youngho Son, Gyeongsangbuk-do (KR); Hyo Jin Han, Gyeonsagbuk-do (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 15/253,134

(22) Filed: Aug. 31, 2016

(65) Prior Publication Data

US 2016/0368414 A1    Dec. 22, 2016

Related U.S. Application Data

(63) Continuation-in-part of application No. 14/577,065, filed on Dec. 19, 2014, now abandoned.

(51) Int. Cl.
*B60Q 1/14* (2006.01)
*B60Q 1/08* (2006.01)
*F21S 8/10* (2006.01)

(52) U.S. Cl.
CPC ......... *B60Q 1/1423* (2013.01); *B60Q 1/085* (2013.01); *B60Q 1/143* (2013.01); *F21S 48/1154* (2013.01); *F21S 48/1258* (2013.01); *F21S 48/1747* (2013.01); *B60Q 2300/054* (2013.01); *B60Q 2300/056* (2013.01); *B60Q 2300/41* (2013.01); *B60Q 2300/42* (2013.01); *B60Q 2300/45* (2013.01); *F21S 48/1159* (2013.01); *F21S 48/137* (2013.01)

(58) Field of Classification Search
CPC .................................................. B60Q 1/1423
See application file for complete search history.

(56) References Cited

U.S. PATENT DOCUMENTS

| | | | |
|---|---|---|---|
| 2004/0179367 A1* | 9/2004 | Takeda ..................... | B60Q 1/04 362/466 |
| 2007/0025117 A1* | 2/2007 | Watanabe ............ | F21S 48/1159 362/545 |
| 2009/0086500 A1* | 4/2009 | Tatara .................... | B60Q 1/076 362/512 |

(Continued)

*Primary Examiner* — Douglas W Owens
*Assistant Examiner* — Pedro C Fernandez
(74) *Attorney, Agent, or Firm* — Mintz Levin Cohn Ferris Glovsky and Popeo, P.C.; Kongsik Kim; Colleen H. Witherell

(57) ABSTRACT

An ADB headlamp distributes light having more partial pattern segments than light sources form a dark zone in a segment where a preceding or oncoming vehicle is located is provided. The adaptive driving beam (ADB) headlamp for a vehicle includes first lamp and second lamps having a plurality of light sources. The plurality of partial patterns irradiated from adjacent light sources included in the first and second lamps respectively, partially overlap other to form a first and a second light distribution patterns. The first and second light distribution patterns formed by the first and second lamps partially overlap each other to form a light distribution pattern. The light distribution pattern is divided into a plurality of partial pattern segments that correspond to the location of a sensed vehicle ahead selected from the partial pattern segments. A dark zone is formed by the partial pattern segments by reducing a light source.

23 Claims, 33 Drawing Sheets

(56) References Cited

U.S. PATENT DOCUMENTS

| | | | |
|---|---|---|---|
| 2011/0121733 A1* | 5/2011 | Choi | B60Q 1/122 315/82 |
| 2013/0201713 A1* | 8/2013 | Suzuki | B60Q 1/04 362/516 |
| 2013/0279186 A1* | 10/2013 | Okamoto | F21S 48/1742 362/466 |
| 2014/0043842 A1* | 2/2014 | Mochizuki | F21S 48/17 362/543 |

* cited by examiner

ADAPTIVE DRIVING BEAM HEADLAMP FOR VEHICLE

This application is a continuation-in-part application of application Ser. No. 14/577,065, filed on Dec. 19, 2014, which claims priority to Korean Patent Application No. 10-2013-0159868, filed on Dec. 20, 2013. The applications are incorporated herein by reference.

BACKGROUND

1. Technical Field

The present inventive concept relates to an adaptive driving beam (ADB) headlamp for a vehicle and more particularly, to an ADB headlamp which forms a light distribution having segments in which a preceding or oncoming vehicle is detected.

2. Related Art

Generally, a vehicle includes various types of lamps having a lighting function and a signaling function. The lighting function enables the driver of the vehicle to detect objects around the vehicle while driving at night. The signaling function is used to inform other vehicles and road users of the vehicle's driving intentions. For example, a headlamp and a fog lamp are designed for the lighting function, and a turn signal lamp, a tail lamp, a brake lamp and a side marker are designed for the signaling function. The installation standards and specifications for these vehicle lamps are defined by law. In particular, a headlamp forms a low beam pattern or a high beam pattern to secure the driver's view ahead of the vehicle in a low light condition (e.g., at night). The headlamp therefore improves safe driving.

The headlamp normally maintains the low beam pattern to prevent a dazzle effect of the drivers of oncoming vehicles driving in the opposite direction or the drivers of preceding vehicles. However, during high-speed driving or in a low light areas the headlamp forms the the high beam pattern to ensure safe driving. In other words, the driver of a vehicle may drive with the high beam pattern by failing to recognize an oncoming vehicle or a preceding vehicle. In particular, the driver of the oncoming vehicle or the driver of the preceding vehicle may be dazzled by light, which may potentially cause a safety accident. Therefore, an adaptive driving beam (ADB) headlamp has recently been introduced. When an oncoming oncoming or preceding vehicle is sensed while the driver of a vehicle operates the high beam pattern, the ADB headlamp automatically adjusts its light irradiation angle, brightness, width and length in order to prevent a dazzle effect to the field of vision of the driver of the oncoming or preceding vehicle.

ADB headlamps for vehicles may be divided into a dynamic type and a matrix type. When an oncoming vehicle or a preceding vehicle is sensed, a headlamp of the dynamic type may form a dark zone in a space in which the oncoming vehicle or the preceding vehicle is located by changing its angle using a swivel actuator. Conversely, a headlamp of the matrix type may form the dark zone in the space in which the oncoming vehicle or the preceding vehicle is located by selectively turning on or off a plurality of light sources. In a matrix type ADB headlamp, a plurality of light sources are densely arranged to prevent the formation of a dark zone due to a gap between a plurality of partial patterns formed by beams emitted respectively from the light sources. This increases the number of components, resulting in an increase in manufacturing costs. For example, since a plurality of light sources are densely arranged to prevent partial patterns formed by beams emitted from adjacent light sources from being separated from each other, the number of light sources is increased, which increases manufacturing costs.

Additionally, each of the partial patterns formed by the beams emitted from the light sources has an irradiation range of a specific angle. When the size of a sensed preceding or oncoming vehicle is less than the irradiation range of a partial pattern formed by any one light source, an unnecessary dark zone may be formed by the turning off of the light source. Therefore, it is difficult to form a dark zone in an exact range.

The matters disclosed in this section are merely for enhancement of understanding of the general background of the invention and should not be taken as an acknowledgment or any form of suggestion that the matters form the related art already known to a person skilled in the art.

SUMMARY

The present invention provides an adaptive driving beam (ADB) headlamp that may include a reduced number of light sources by making an adjacent plurality of partial patterns formed by beams emitted from a plurality of light sources partially overlap each other and may be manufactured with reduced cost due to a reduction in the number of components. An ADB headlamp which forms a light distribution pattern having a greater number of segments than the number of light sources by making adjacent partial patterns partially overlap each other may prevent the formation of an unnecessary dark zone by forming a dark zone in an exact segment in which a preceding vehicle or an oncoming vehicle is located. For example, an ADB headlamp that may form a dark zone with a smooth boundary by adjacent partial patterns when a selected segment may be formed as the dark zone by making a plurality of partial patterns be irradiated to segment by making adjacent partial patterns partially overlap each other.

An adaptive driving beam (ADB) headlamp for a vehicle, the headlamp may include a first lamp having a plurality of light sources and a second lamp having a plurality of light sources. A plurality of partial patterns irradiated from adjacent light sources included in the first lamp may partially overlap each other to form a first light distribution pattern and a plurality of partial patterns irradiated from adjacent light sources included in the second lamp may partially overlap each other to form a second light distribution pattern. The first light distribution pattern formed by the first lamp and the second light distribution pattern formed by the second lamp may at least partially overlap each other to form a light distribution pattern. The light distribution pattern may be divided into a plurality of segments. A segment may correspond to the location of a sensed vehicle ahead selected from the segment and the selected partial pattern segment may be formed as a dark zone by turning off or dimming at least one light source which irradiates a partial pattern to the selected segment.

In some exemplary embodiments, the first light distribution pattern formed by the first lamp and the second light distribution pattern formed by the second lamp may overlap each other on an inboard side of a vehicle and may not overlap each other on an outboard side of the vehicle. In other exemplar embodiments, the partial pattern located on the outboard side may have a width that is greater than a width of the partial pattern located on the inboard side. The partial patterns may gradually become wider toward the outboard side.

In other exemplary embodiments, the gap between segments of light distribution patterns on the inboard side may be less than a gap between segments of light distribution patterns on the outboard side such that the light distribution patterns on the inboard side are formed as a dark zone with a narrower range than the light distribution patterns on the outboard side.

In some exemplary embodiments, each of the segments may include at least one partial pattern. In other exemplary embodiments, each of the segments may include at least three partial patterns in a central part of the vehicle and may include a gradually reduced number of partial patterns toward an edge of the vehicle. The number of the segments may be greater than the number of the light sources included in the first lamp and the second lamp.

When the segment that corresponds to the location of the sensed vehicle ahead is selected to form the dark zone, an adjacent segment may be additionally selected when specific conditions are met. The specific conditions comprise at least one of the group consisting of speed of the vehicle being driven, the degree of handle manipulation, the speed of the sensed vehicle ahead, the location change rate of the sensed vehicle ahead, the distance between the vehicle being driven and the sensed vehicle ahead, and the surrounding environment. The amount of light of the light distribution pattern may be gradually reduced from the inboard side toward the outboard side.

In another aspect an exemplary embodiment includes an ADB headlamp for a vehicle. The headlamp may include a first lamp that includes a plurality of light sources; a second lamp that includes a plurality of light sources; and a light amount controller configured to operate the light sources included in the first lamp and the light sources included in the second lamp to provide the amount of light that is greater in a central area of a width of a vehicle than in an edge area of the width of the vehicle. The light emitted from each of the light sources of the first lamp forms a first partial pattern and at least one of the first partial patterns may overlaps an adjacent first partial pattern to form a first light distribution pattern, and the light emitted from each of the light sources of the second lamp may form a second partial pattern and at least one of the second partial patterns overlaps an adjacent second partial pattern to form a second light distribution pattern. The first light distribution pattern formed by the first lamp and the second light distribution pattern formed by the second lamp may at least partially overlap each other to form a light distribution pattern.

In some exemplary embodiments, the light amount controller may be configured to operate the first lamp and the second lamp to reduce the amount of light irradiated from the central area of the width of the vehicle toward the edge area of the width of the vehicle. The light amount controller may be configured to adjust the amounts of light irradiated from both sides of the front of the vehicle by operating the first lamp and the second lamp provided at both sides of the front of the vehicle, respectively. In other exemplary embodiments, the light light amount controller may be configured to operate the first lamp and the second lamp to irradiate similar amounts of light from both sides of the front of the vehicle.

In some exemplary embodiments, the light amount controller may be configured to operate the first lamp and the second lamp to irradiate different the amounts of light from both sides of the front of the vehicle. The first lamp and the second lamp may include a plurality of lamp modules having light sources, and each of the lamp modules may include a light source module having a light emitting diode (LED).

In other exemplary embodiments, each of the lamp modules may include a tunnel which guides light emitted from the light source module to an opening on a side; and a lens which projects light emerging from the opening. The lens may refract the light emerging from the opening to reduce a diffusion range of the light that is projected. Each of the lamp modules may include a reflector which reflects light from the light source module in a forward direction, wherein the reflector may include a plurality of light reflecting units which reflect light to a specific point.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
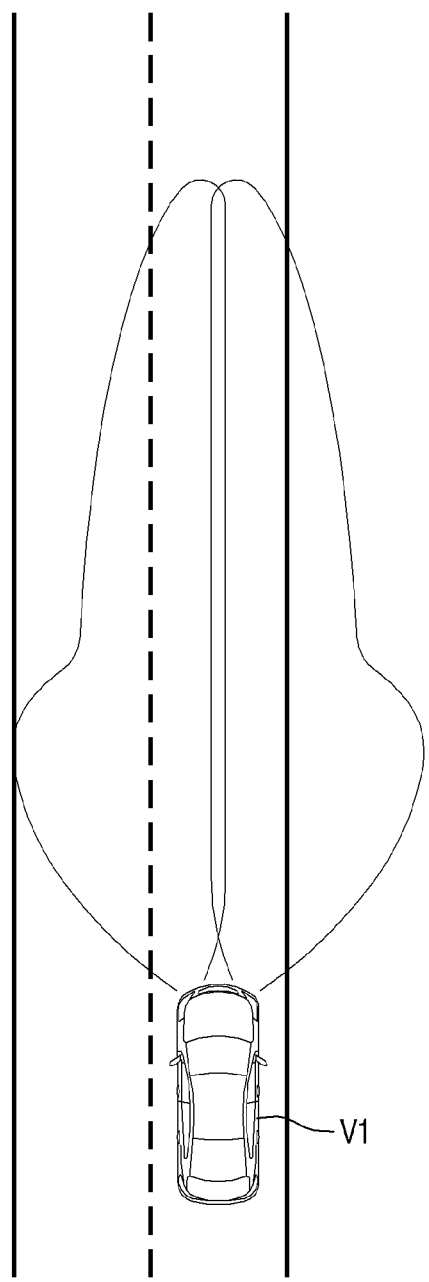
FIG. 1 illustrates an exemplary road-surface light distribution pattern formed by an adaptive driving beam (ADB) headlamp for a vehicle according to an exemplary embodiment.

Advantages and features of the inventive concept and methods of accomplishing the same may be understood more readily by reference to the following detailed description of exemplary embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the invention to those skilled in the art, and the inventive concept will only be defined by the appended claims. Like reference numerals refer to like elements throughout the specification. In some embodiments, well-known processes, well-known structures and well-known technologies will not be specifically described in order to avoid ambiguous interpretation of the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, and/or operations, but do not preclude the presence or addition of one or more other components, steps, operations, and/or groups thereof. As used herein, the term "and/or" includes any and all combinations of one or more of the associated listed items.

Embodiments of the inventive concept are described herein with reference to perspective, cross-sectional, side and/or schematic illustrations that are schematic illustrations of idealized embodiments of the inventive concept. As such, variations from the shapes of the illustrations as a result, for example, of manufacturing techniques and/or tolerances, are to be expected. Thus, embodiments of the inventive concept should not be construed as limited to the particular shapes of regions illustrated herein but are to include deviations in shapes that result, for example, from manufacturing. In addition, each component shown in figures of the embodiments may have been enlarged or reduced for ease of description.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Hereinafter, an adaptive driving beam (ADB) headlamp for a vehicle according to the inventive concept will be described with reference to the accompanying drawings, in which exemplary embodiments of the inventive concept are shown.

Figure 2:
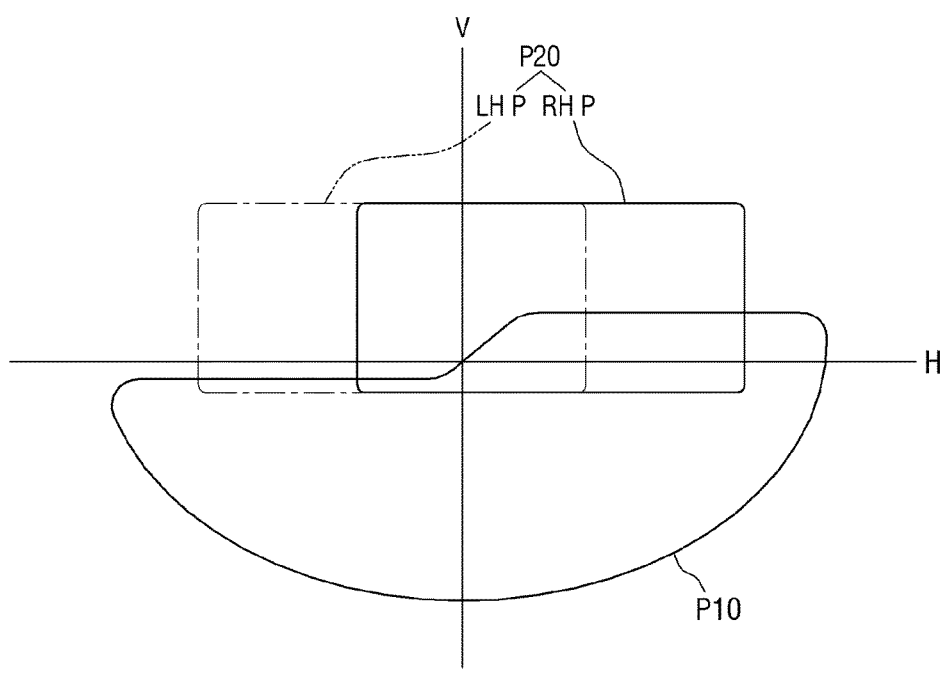
FIG. 2 illustrates an exemplary light distribution pattern formed by the ADB headlamp for a vehicle according to the exemplary embodiment.
Figure 3:
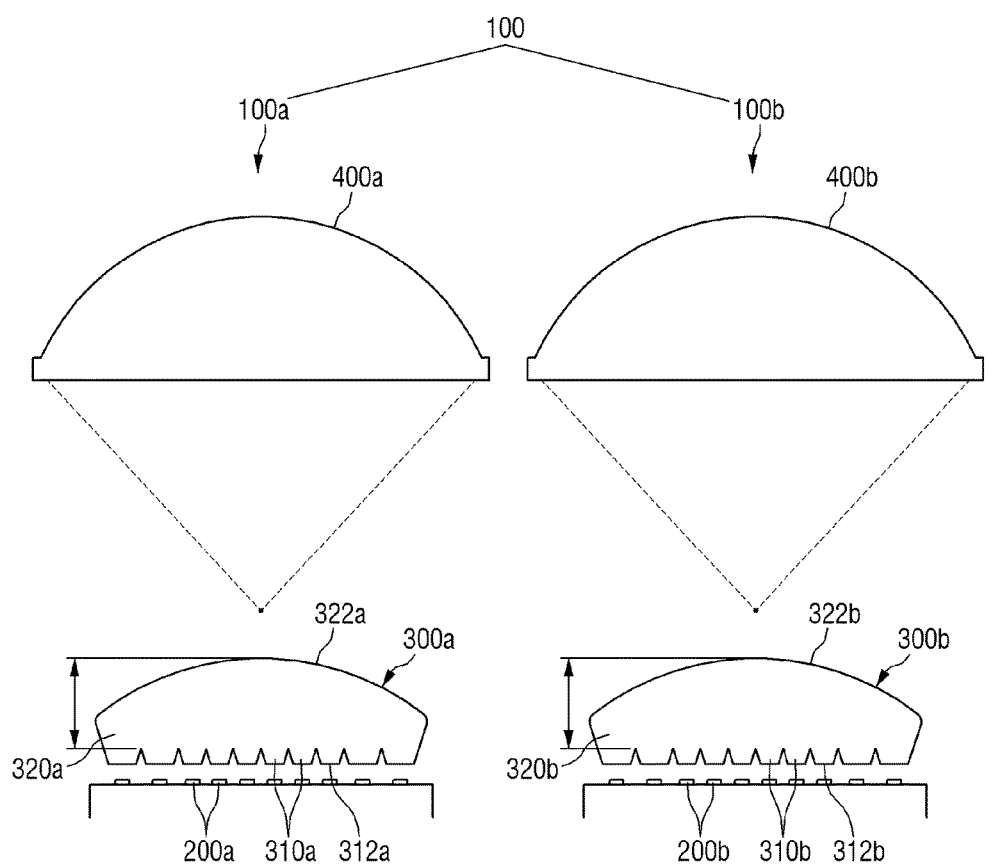
FIG. 3 illustrates an exemplary ADB headlamp for a vehicle according to the exemplary embodiment.
Figure 4:
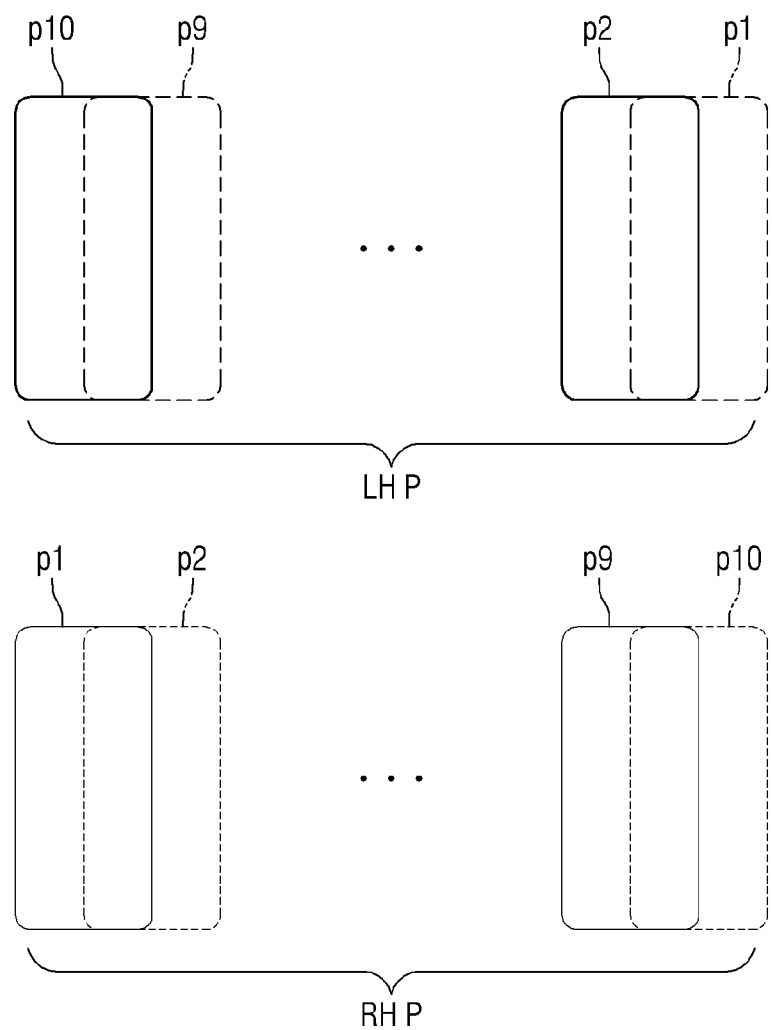
FIG. 4 illustrates an exemplary the overlapping relationship between partial patterns included in (?) a light distribution pattern formed by each of a left lamp and a right lamp of the ADB headlamp of FIG. 3 according to the exemplary embodiment.
Figure 5:
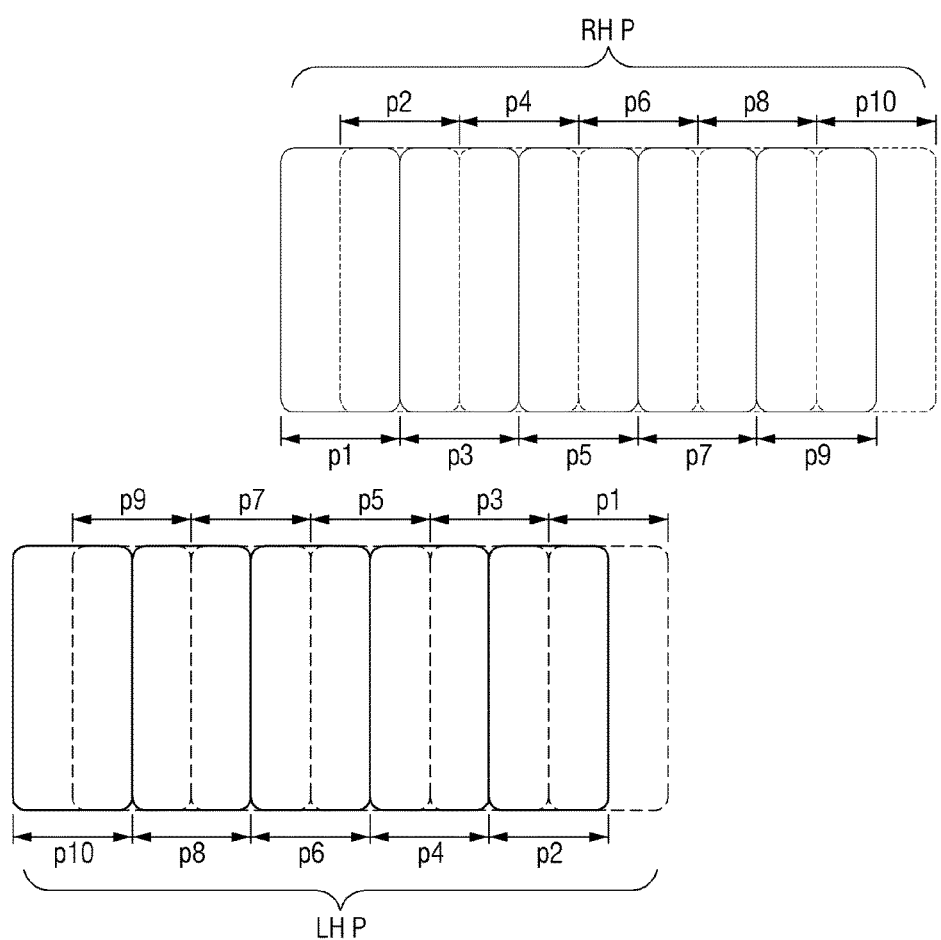
FIG. 5 illustrates an exemplary overlapping relationship between left and right light distribution patterns of FIG. 4 on an inboard side according to the exemplary embodiment.

FIG. 1 illustrates a road-surface light distribution pattern formed by an ADB headlamp for a vehicle according to an exemplary embodiment. FIG. 2 illustrates a light distribution pattern formed by the ADB headlamp for a vehicle according to the exemplary embodiment. In addition, FIG. 3 illustrates the ADB headlamp for a vehicle according to the exemplary embodiment. FIG. 4 illustrates the overlapping relationship between partial patterns included in a light distribution pattern formed by each of a left lamp and a right lamp of the ADB headlamp of FIG. 3. FIG. 5 illustrates the overlapping relationship between left and right light distribution patterns of FIG. 4 on an inboard side.

First, referring to FIGS. 1 and 2, an ADB headlamp for a vehicle according to an exemplary embodiment may simultaneously form a low beam pattern P10 and a high beam pattern P20 to provide a driver a long distance view while driving a vehicle. ADB headlamps headlamps for vehicles may be divided into a dynamic type and a matrix type. When an oncoming vehicle or a preceding vehicle may be sensed during driving, a headlamp of the dynamic type may form a dark zone in a space in which the oncoming vehicle or the preceding vehicle may be located by changing its angle using a swivel actuator. Conversely, a headlamp of the matrix type may form the dark zone in the space in which the oncoming vehicle or the preceding vehicle may be located by selectively turning on or off a plurality of light sources. Of the above two types, the matrix type will be described as the ADB headlamp for a vehicle according to the exemplary embodiment.

While a vehicle is being driven, a matrix type ADB headlamp may simultaneously form the low beam pattern P10 and the high beam pattern P20 as illustrated in FIG. 2. Generally, a vehicle may include a pair of a left lamp and a right lamp at both sides of the front of the vehicle. Therefore, the high beam pattern P20 may include high beam patterns LH P and RH P formed simultaneously by the left lamp and the right lamp, respectively. In other words, the high beam pattern LH P by the left lamp and the high beam pattern RH P by the right lamp may partially overlap each other on the inboard side of the vehicle.

The matrix type ADB headlamp may include a plurality of light sources and may form a high beam pattern which includes a plurality of partial patterns formed by light emitted from the light sources. Therefore, when an oncoming vehicle or a preceding vehicle may be sensed while a vehicle is being driven, some partial patterns irradiated to an area in which the oncoming vehicle or the preceding vehicle is located may be removed, thereby forming a dark zone. In particular, while a vehicle is being driven, a camera may photograph the area ahead of the vehicle in real time. When a sensing unit senses the location of an oncoming vehicle or a preceding vehicle based on a photographed image, a control unit may be configured to remove some partial patterns irradiated to an area in which the oncoming vehicle or the preceding vehicle may be located by selectively turning off or dimming some of the light sources, thereby forming a dark zone.

Therefore, when there is no oncoming or preceding vehicle ahead, a driver may ensure safe driving by securing a long distance view through a high beam pattern as well as a low beam pattern. When there is an oncoming or preceding vehicle, the driver may prevent dazzling drivers of other vehicles by removing some partial patterns irradiated to an area in which the oncoming or preceding vehicle may be located, which may also ensure safe driving.

As mentioned earlier, an ADB headlamp for a vehicle may be provided in a pair at both sides of the front of a vehicle. Accordingly, an ADB headlamp for a vehicle according to an exemplary embodiment may be also placed at both sides of the front of a vehicle. Specifically, as illustrated in FIG. 3, the ADB headlamp for a vehicle according to the exemplary embodiment may include a left lamp and a right lamp. A light distribution patterns may be irradiated by the left lamp and the right lamp and may partially overlap each other. In other words, a light distribution pattern LH P irradiated from the left lamp and a light distribution pattern RH P irradiated from the right lamp may partially overlap each other and a brighter light distribution pattern may be formed in an overlap area than in a non-overlap area. For example, a plurality of light sources may be disposed in each of the left lamp and the right lamp. Partial patterns irradiated from light sources located on the inboard side may overlap each other and partial patterns irradiated from light sources located on the outboard side may not overlap each other.

Referring to FIG. 3, an ADB headlamp 100 for a vehicle according to an exemplary embodiment may include a first lamp 100a which may be placed at a front left side of a vehicle and a second lamp 100b which may be disposed at a front right side of the vehicle. In the exemplary embodiment, a lamp disposed at the front left side of the vehicle will be referred to as the first lamp 100a, and a lamp disposed at the front right side of the vehicle will be referred to as the second lamp 100b. However, the direction may be reversed.

Each of the first lamp 100a and the second lamp 100b may include a plurality of light sources 200a or 200b which are arranged in a specific form, an assembled lens 300a or 300b which may form beams emitted from the light sources 200a or 200b that partially overlap each other by mixing the beams and a lens 400a or 400b which transmits the beams that pass through the assembled lens 300a or 300b. The light sources 200a and 200b may emit light in response to an electric current signal. The light sources 200a and 200b may be light emitting diodes (LED) which are light emitting elements. However, the light sources 200a and 200b may not be limited to LEDs and various types of light sources including bulbs and lasers may be applied.

Each of the assembled lenses 300a or 300b may include a plurality of light guides 310a or 310b which are disposed in a light emitting direction of the light sources 200a or 200b and direct beams emitted from the light sources 200a or 200b forward by refracting the beams. A light mixer 320a or 320b may be formed to a predetermined thickness from the light guides 310a or 310b and may partially mix beams that pass through adjacent light guides. For example, the light guides 310a or 310b of each of the assembled lenses 300a and 300b have incident surfaces 312a or 312b at their respective surfaces. The beams emitted from the light sources 200a or 200b may be incident on the incident surfaces 312a or 312b, respectively. Therefore, the number of the light guides 310a or 310b may correspond to the number of the light sources 200a or 200b.

In the drawing provided to support the ADB headlamp 100 for a vehicle according to the exemplary embodiment, 10 light sources 200a or 200b may be included in each of the first lamp 100a and the second lamp 100b, and 10 light guides 310a or 310b may be included in the assembled lens 300a or 300b of each of the first lamp 100a and the second lamp 100b. However, the number of the light sources 200a or 200b and the number of the light guides 310a or 310b are not limited to the above example and may vary as long as the number of the light sources 200a or 200b is equal to the number of the light guides 310a or 310b of each of the assembled lenses 300a and 300b to allow the light sources 200a or 200b and the light guides 310a or 310b to be form pairs.

The light guides 310a or 310b of each of the assembled lenses 300a and 300b may extend a predetermined distance from the incident surfaces 312a or 312b. For example, side surfaces of the light guides 310a or 310b may slope, (i.e., may gradually become wider from the incident surfaces 312a or 312b). Therefore, when beams emitted from the light sources 200a or 200b are incident on the incident surfaces 312a or 312b of the light guides 310a or 310b, they may be reflected and refracted by the side surfaces of the light guides 310a or 310b. In other words, the beams may pass through the light guides 310a or 310b while being gradually spread wider.

When the beams passing through the light guides 310a or 310b pass through the light mixer 320a or 320b, adjacent beams may be partially mixed with each other by the light mixer 320a or 320b. Then, the mixed beams may be emitted through an emitting surface 322a or 322b of each of the assembled lenses 300a and 300b to form partial patterns p1 through p10. The partial patterns p1 through p10 may form overlap areas by partially overlapping each other as illustrated in FIGS. 4 and 5. In the exemplary embodiment, the number of the light sources 200a or 200b that may be included in each of the first lamp 100a and the second lamp 100b is 10. Therefore, when the number of the partial patterns p1 through p10 which are emitted from the ten light sources 200a or 200b and pass through the assembled lens 300a or 300b and the lens 400a or 400b may also 10 will be described as an example.

Referring to FIGS. 3 through 5, the light sources 200a of the first lamp 100 at a left side may be sequentially numbered from a first light source located on the inboard side. A beam emitted from the first light source may pass through a light guide 310a of the assembled lens 300a which corresponds to the first light source to be emitted through the emitting surface 322a. A beam emitted from a second light source may pass through a light guide 310a of the assembled lens 300a which corresponds to the second light source to be emitted through the emitting surface 322a. After the beams emitted from the first light source and the the second light source pass through their corresponding light guides, they may be partially mixed with each other as they pass through the light mixer 320a.

In other words, the beams entering the light guides 310a may be successively refracted as they are reflected by the sloping side surfaces of the light guides 310a. Accordingly, the beams may be gradually spread and the spread beams may be spread wider as they pass through the light mixer 320a. Therefore, the beam emitted from the first light source and the beam emitted from the second light source may be partially mixed with each other in the light mixer 320a. The beams partially mixed with each other may be transmitted through the lens 400a to form a light distribution pattern LH P as a combination of partial patterns p1 and p2 which partially overlap each other as illustrated in FIGS. 4 and 5.

According to the above operation principle, beams emitted from the second through tenth light sources may form the light distribution pattern LH P as a combination of partial patterns p1 through p10 which partially overlap each other. While the first lamp 100a at the left side has been described above as an example, the second lamp 100b at a right side which is configured and operated in a similar manner as the first lamp 100a may also form a light distribution pattern RH P as a combination of partial patterns p1 through p10 which partially overlap each other. Therefore, since beams emitted from adjacent light sources 200a or 200b form a light distribution pattern LH P or RH P whose partial patterns p1 through p10 partially overlap each other, even when the light sources 200a or 200b are sparsely arranged at predetermined intervals instead of being densely arranged as in the past, a light distribution pattern LH P or RH P of a set range may be formed.

In other words, since a beam emitted from any one light source may form a partial pattern having a wider range as it successively passes through a light guide 310a or 310b and the light mixer 320a or 320b, a gap between the light sources 200a or 200b may be increased. Accordingly, a smaller number of the light sources 200a or 200b may be used. This reduces the number of components, resulting in a reduction in manufacturing costs. In particular, beams emitted from adjacent light sources may be partially mixed with each other to form overlap areas in the partial patterns p1 through p10 in the state of a greater gap between the light sources 200a or 200b and a smaller number of the light sources 200a or 200b. Therefore, the formation of a dark zone between the partial patterns p1 through p10 may be prevented with a smaller number of the light sources 200a or 200b. Additionally, since beams emitted from adjacent light sources 200a or 200b may be partially mixed with each other to form overlap areas in the partial patterns p1 through p10, a uniform and smooth light distribution LH P or RH P may be formed.

The light guides 310a or 310b of the assembled lens 300a or 300b may be integrally formed with the light mixer 320a or 320b. For example, one emitting surface 322a or 322b may be formed at one surface of the light mixer 320a or 320b. Therefore, after beams that pass through their corresponding light guides 310a or 310b are partially mixed with each other, the partially mixed beams may be emitted through the one emitting surface 322a or 322b. For reference, the emitting surface 322a or 322b of each of the assembled lenses 300a and 300b may have surface characteristics of a spherical lens, an aspheric lens, a preform lens, etc. Additionally, the overlap range of adjacent patterns p1 through p10 and the clarity of a beam pattern LH P or RH P may vary based on the length of the light guides 310a or 310b and the thickness of the light mixer 320a or 320b.

In the ADB headlamp 100 according to the exemplary embodiment, the focus of the assembled lenses 300a and 300b and the focus of the lenses 400a and 400b may be separated from each other by a specific distance. In particular, the assembled lenses 300a and 300b and the lenses 400a and 400b may be defocused as illustrated in FIG. 3. When the assembled lenses 300a and 300b and the lens 400a or 400b are defocused, the partial patterns p1 through p10 emitted respectively from the light sources 200a or 200b may be out of focus, and thus their images may be relatively blurred. Accordingly, the boundaries of the partial patterns p1 through p10 partially overlapping each other may be blurry instead of being clear. As a result, a more uniform and smooth light distribution pattern LH P or RH P may be irradiated.

As described above, in the ADB lamp 100 for a vehicle according to the exemplary embodiment, beams emitted from adjacent light sources 200a of the first lamp 100a form partial patterns p1 through p10 which partially overlap each other. Additionally, beams emitted from adjacent light sources 200b of the second lamp 100b form partial patterns p1 through p10 which partially overlap each other. Further, a first light distribution pattern LH P P by the first lamp 100a and a second light distribution pattern RH P by the second lamp 100b may partially overlap each other on the inboard side. Therefore, a central portion of an area in a driving direction of a vehicle may be brighter.

Since the partial patterns p1 through p10 formed by adjacent light sources 200a or 200b partially overlap each other a greater number of partial pattern segments (e.g., segments) than the number of light sources may be formed. The formation of a dark zone may be more precisely controlled by selectively turning on or off corresponding light sources. The control relationship for forming a precise dark zone by forming more partial pattern segments with a small number of light sources using the ADB headlamp 100 for a vehicle will now be described below.

Figure 6:
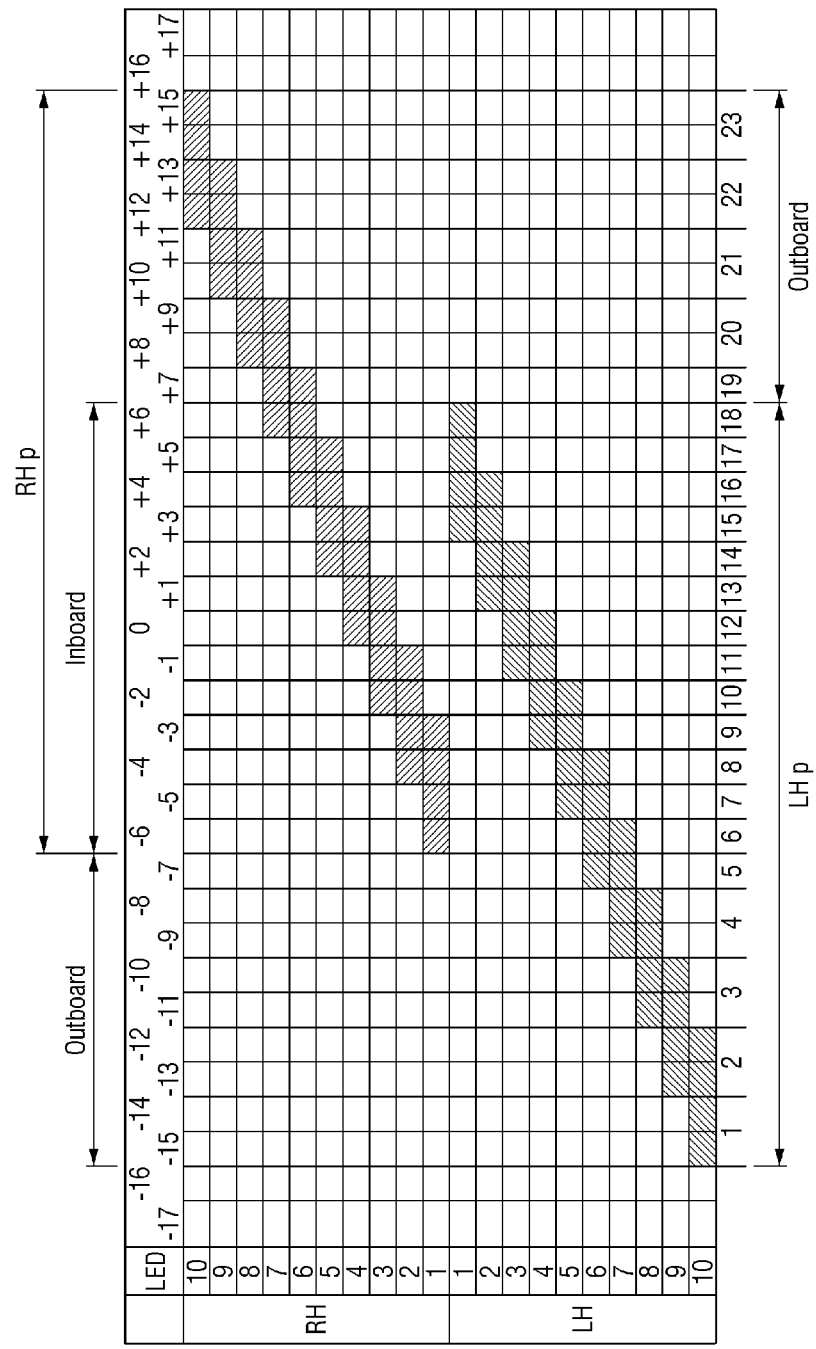
FIG. 6 illustrates, an exemplary table that shows the overlapping relationship between each pair of adjacent partial patterns included in a light distribution pattern formed by the ADB headlamp for a vehicle according to the exemplary embodiment.
Figure 7:
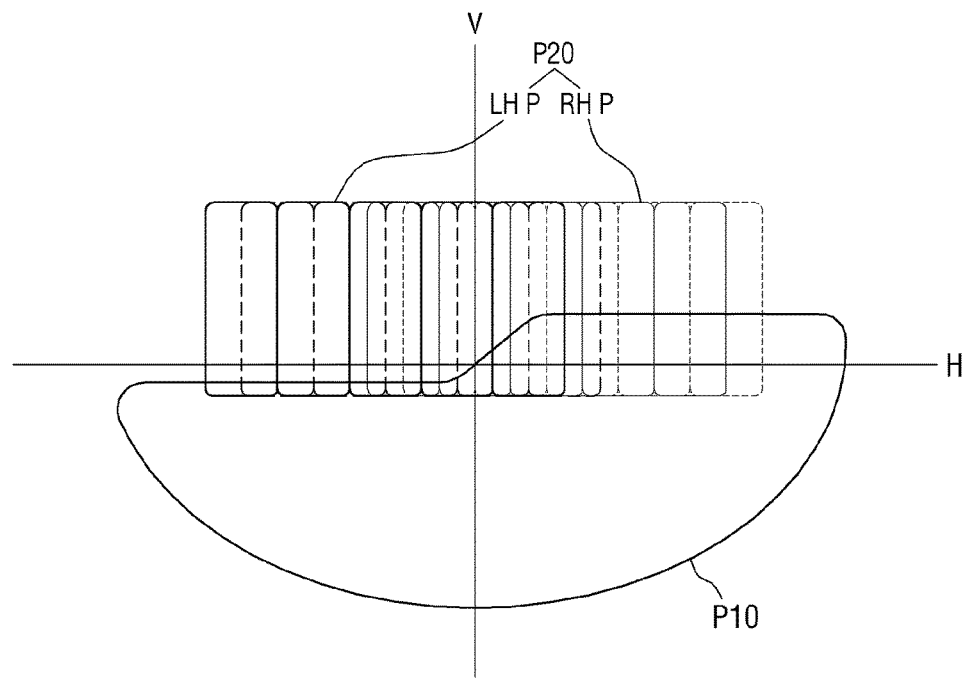
FIG. 7 illustrates an exemplary light distribution pattern having a plurality of partial pattern segments of FIG. 6 according to the exemplary embodiment.

FIG. 6 illustrates an exemplary table that shows the overlapping relationship between each pair of adjacent partial patterns included in a light distribution pattern formed by the ADB headlamp for a vehicle according to the exemplary embodiment. FIG. 7 illustrates the light distribution pattern of FIG. 6. Referring to FIG. 6, a first lamp may include 10 light sources, and a second lamp may include 10 light sources. In other words, a total of 20 light sources are provided. In this state, partial patterns emitted from adjacent light sources of each of the first lamp and the second lamp may partially overlap each other.

For example, an irradiation angle of a partial pattern irradiated from one light source may be about 4 degrees and a part of the partial pattern which overlaps an adjacent partial pattern may form an angle of about 2 degrees. Therefore, partial patterns irradiated from any one light source and another light source adjacent to the light source may form an irradiation angle of about 6 degrees when overlapping each other. Accordingly, when any one light source is turned off or dimmed in a state where all light sources are turned on, a dark zone may be formed in a light distribution pattern by an irradiation angle of about 2 degrees instead of about 4 degrees. Further, even when a light source disposed between different light sources on both sides is turned off or dimmed, no dark zone may be formed in a partial pattern formed by the light source disposed between the different light sources due to partial patterns formed by the different light sources. This will be described in detail later.

As described above, a first light distribution pattern (LH P) formed by the first lamp and a second light distribution pattern (RH P) formed by the second lamp may partially overlap each other on the inboard side. In this overlap area, a dark zone may be formed by an an irradiation angle of about 1 degree through the on/off control of some light sources of the first lamp and the on/off control of some light sources of the second lamp. For example, the light sources of each of the first lamp and the second lamp may be sequentially numbered from 1 to 10 in a direction from the inboard toward the outboard. In other words, No. 1 light light source of the second lamp may overlap up to the middle of an overlap area between No. 6 light source and No. 7 light source of the first lamp at the left side.

Conversely, No. 1 light source of the first lamp may overlap up to the middle of an overlap area between No. 6 light source and No. 7 light source of the second lamp. This overlap of the light distribution patterns LH P and RH P enables the ADB headlamp according to the exemplary embodiment to form 23 partial pattern segments with a total of 20 light sources. Accordingly, some of the 23 partial pattern segments may be formed as a dark zone.

When all light sources of each of the first lamp and the second lamp are turned on as illustrated in FIG. 6, a high beam pattern P20 which is a light distribution pattern without a dark zone may be formed together with a low beam pattern P10 as illustrated in FIG. 7. When a preceding or oncoming vehicle entering the high beam pattern P20 from outside the high beam pattern 20 is sensed while a vehicle is being driven, the corresponding light sources may be turned off or dimmed by a control unit. Accordingly, a dark zone may be formed in a partial pattern segment in which the preceding or oncoming vehicle is located. This control relationship will now be described with reference to FIGS. 8 through 21.

FIGS. 8 through 21 illustrate, are exemplary table that show the overlapping relationship between each pair of adjacent partial patterns included in a light distribution pattern formed by the ADB headlamp for a vehicle according to the exemplary embodiment. FIGS. 8 through 21 also illustrate a state in which some light sources are turned off or dimmed and a dark zone formed in the light distribution pattern, which has a plurality of partial pattern segments, according to the turning off or dimming of some light sources.

Figure 8:
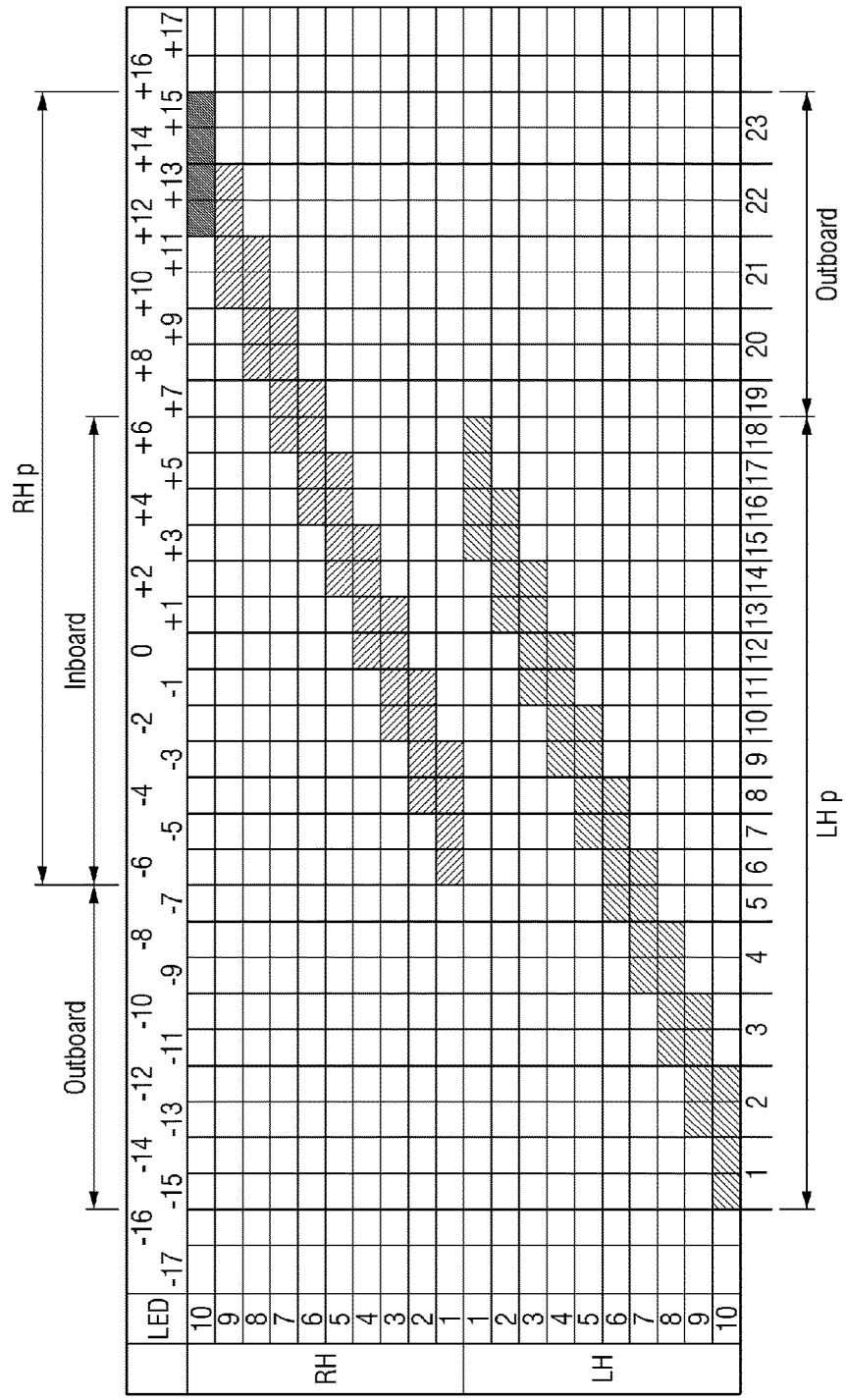
FIGS. 8 through 21 illustrate, exemplary tables that show the overlapping relationship between each pair of adjacent partial patterns included in a light distribution pattern formed by the ADB headlamp for a vehicle according to the embodiment and also illustrate a state in which some light sources are turned off or dimmed and a dark zone formed in the light distribution pattern, which has a plurality of partial pattern segments, according to the turning off or dimming of some light sources according to the exemplary embodiment.
Figure 9:
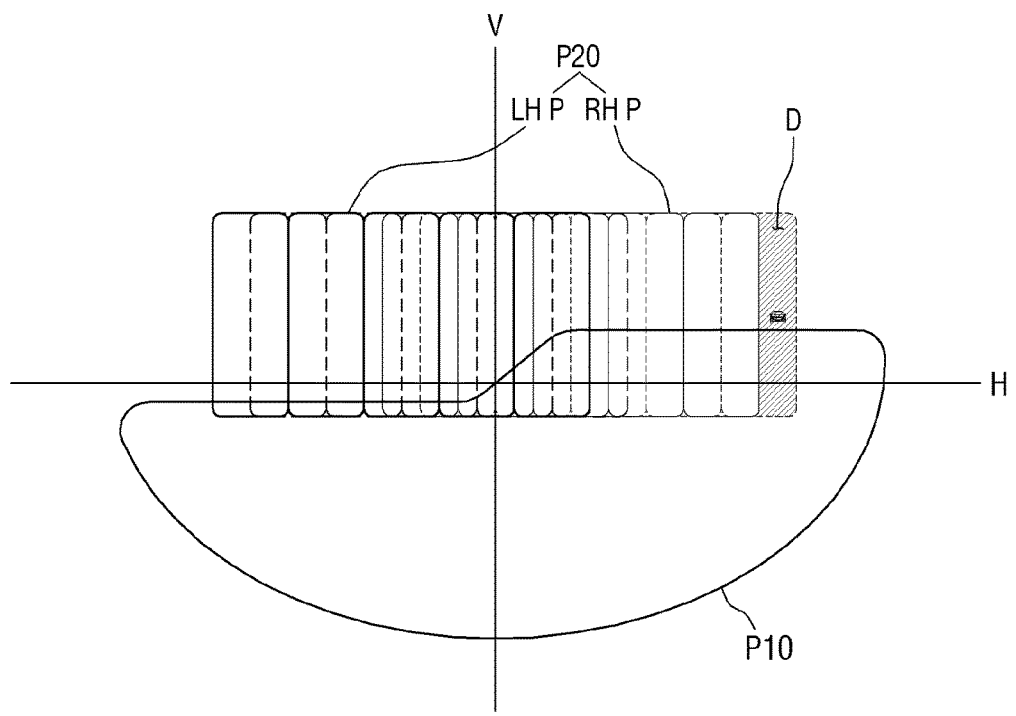
Figure 10:
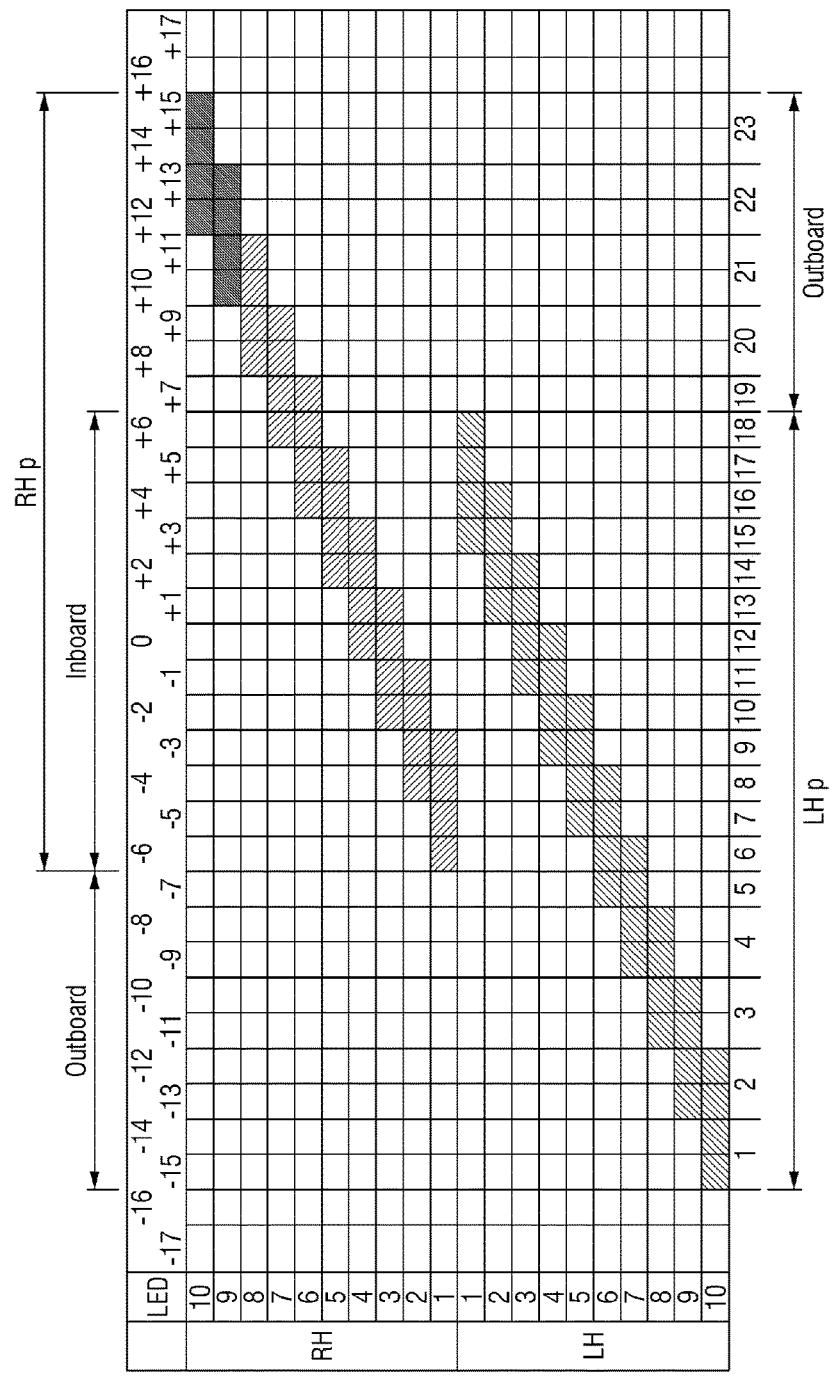
Figure 11:
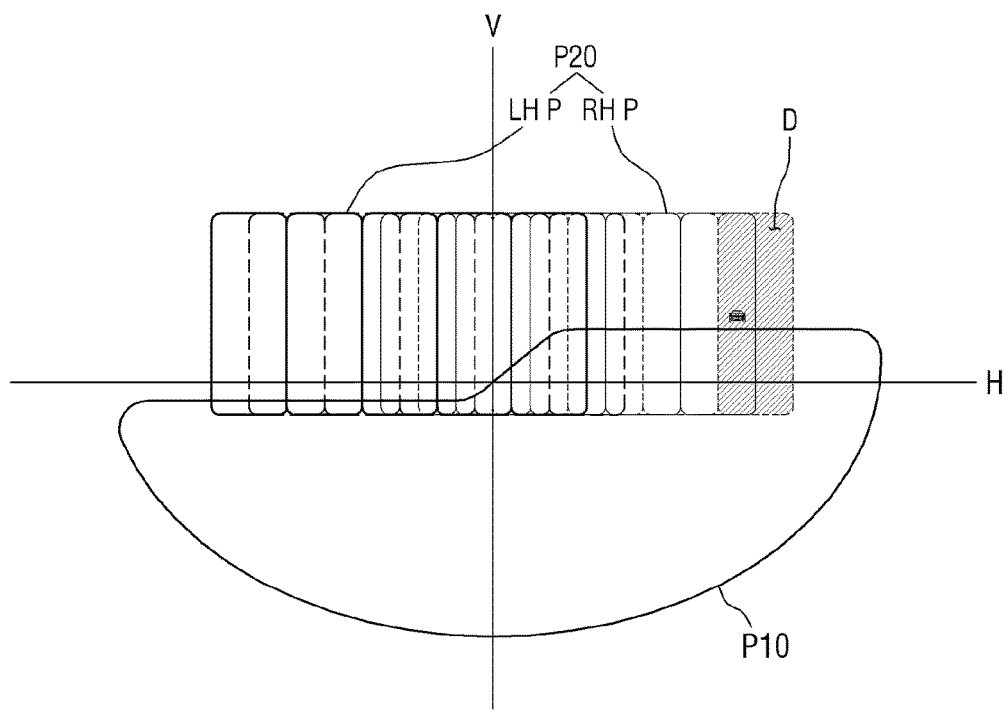

When a vehicle is being driven in a state where an ADB headlamp for a vehicle according to an exemplary embodiment is turned on to form a high beam pattern P20 as well as a low beam pattern P10. When a preceding or oncoming vehicle entering the high beam pattern P20 from outside a right side of a driving direction of the vehicle is sensed to be located in No. 23 partial pattern segment at a rightmost end of the high beam pattern P20, No. 10 light source of a second lamp may be turned off or dimmed to form a corresponding segment (i.e., No. 23 partial pattern segment) as a dark zone D as illustrated in FIGS. 8 and 9. When the preceding or oncoming vehicle enters No. 22 partial pattern segment, No. 10 light source and No. 9 light source of the second lamp may be turned off or dimmed to form corresponding segments (i.e., No. 23 and No. 22 partial pattern segments) as a dark zone D as illustrated in FIGS. 10 and 11.

Figure 12:
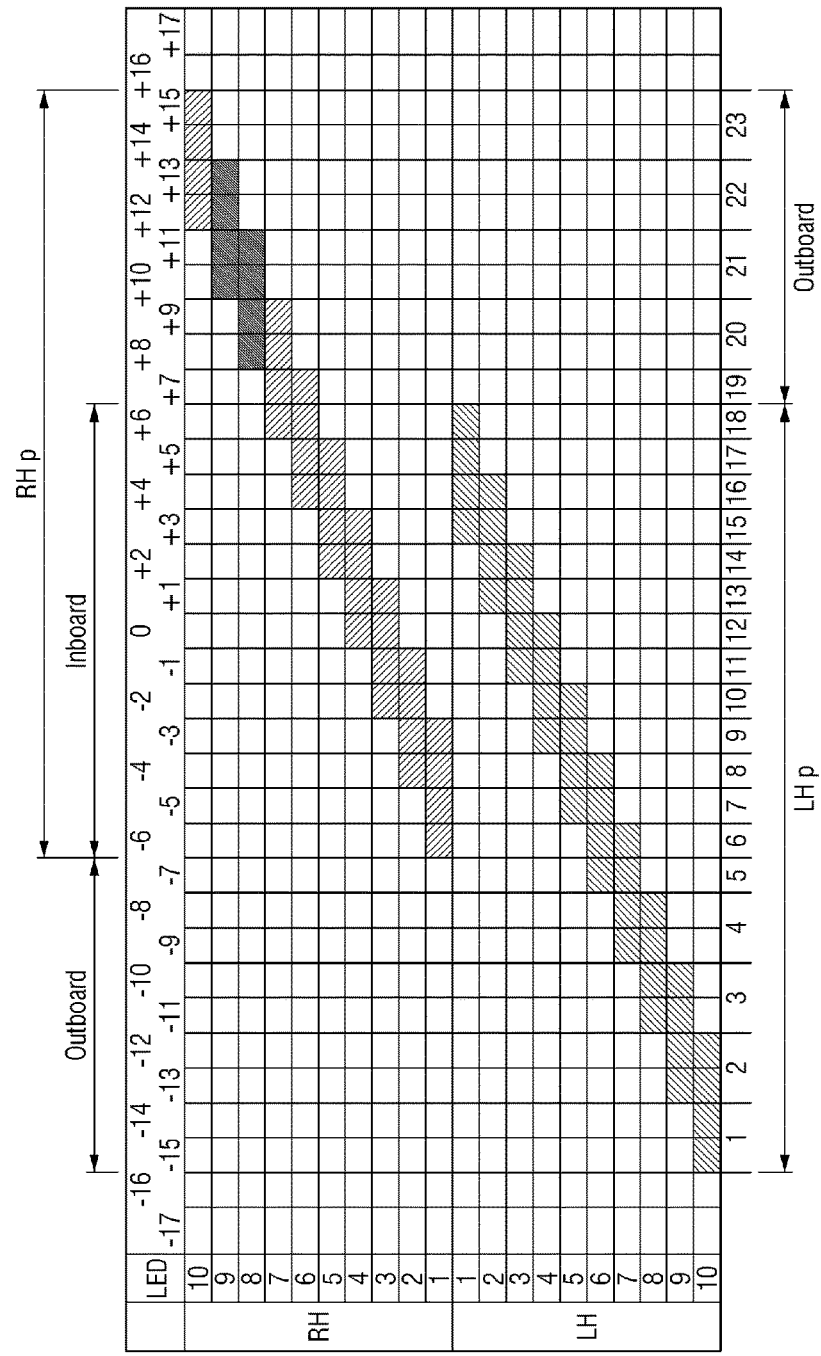
Figure 13:
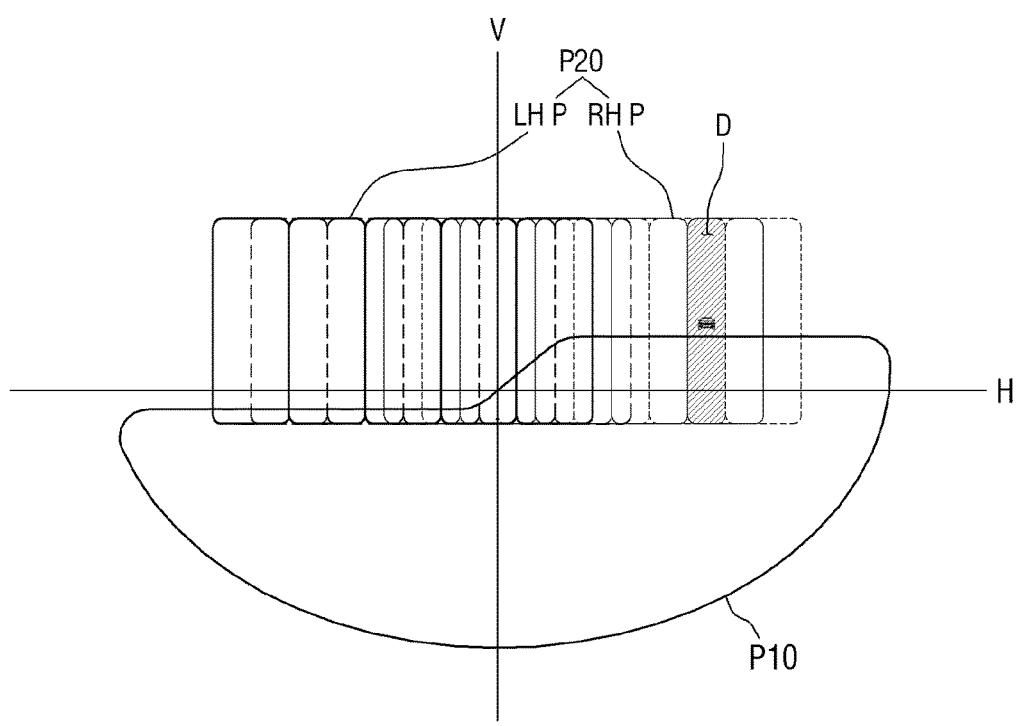

In addition, when the preceding or oncoming vehicle enters No. 21 partial pattern segment, No. 8 light source and No. 9 light source of the second lamp may be turned off or dimmed to form a corresponding segment (i.e., No. 21 partial pattern segment) as a dark zone D as illustrated in FIGS. 12 and 13. In this case, No. 10 light source of the second lamp may be turned on to form the dark zone D only in No. 21 partial pattern segment and may form a light distribution pattern RH P in other partial pattern segments.

Figure 14:
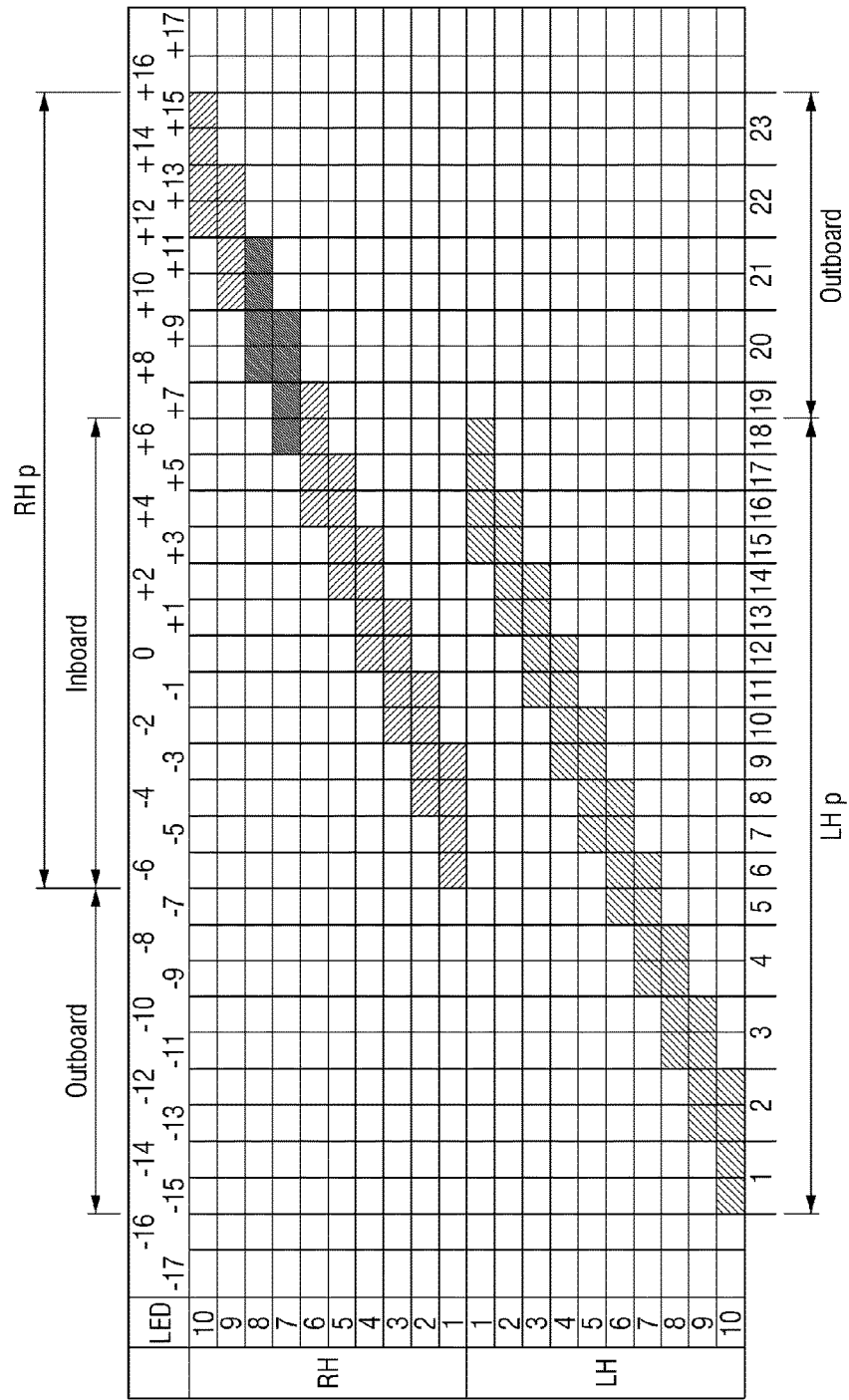
Figure 15:
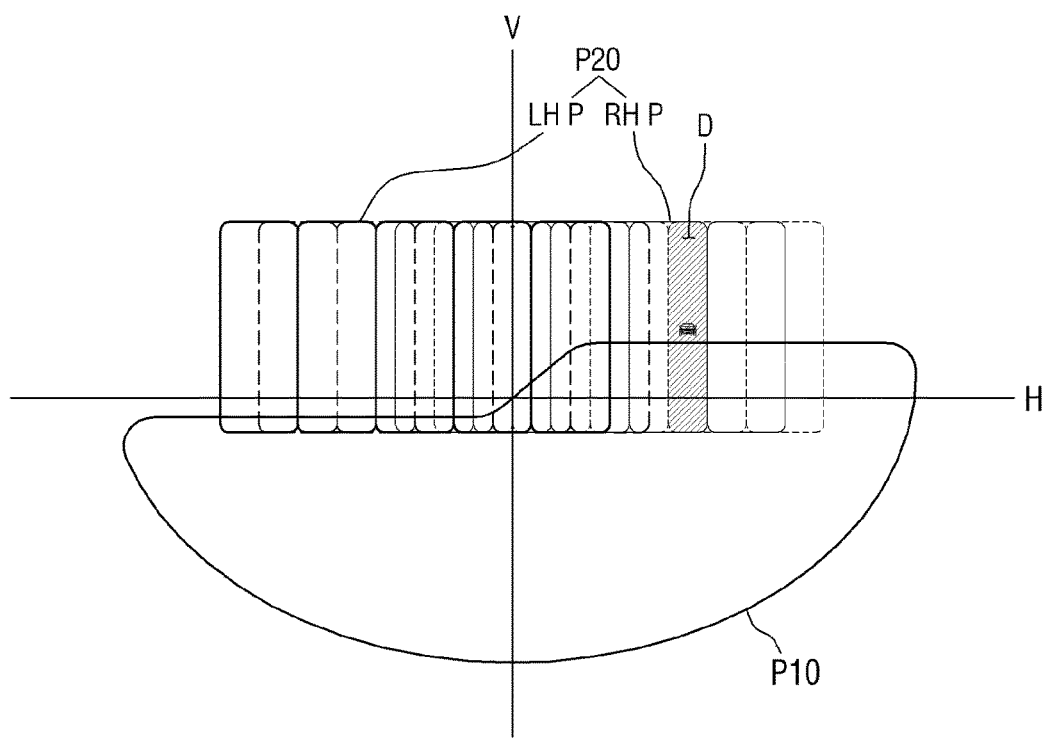
Figure 16:
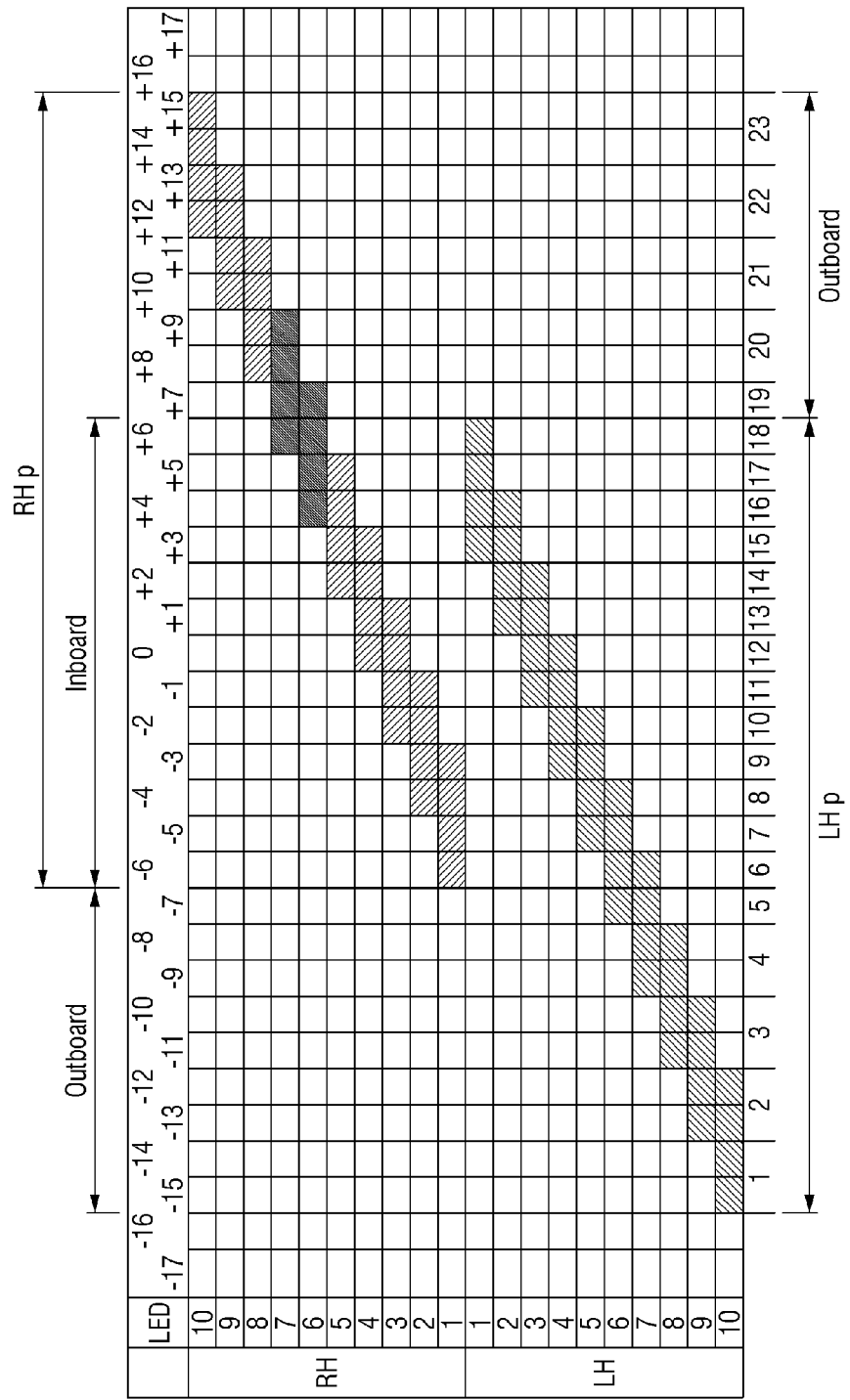
Figure 17:
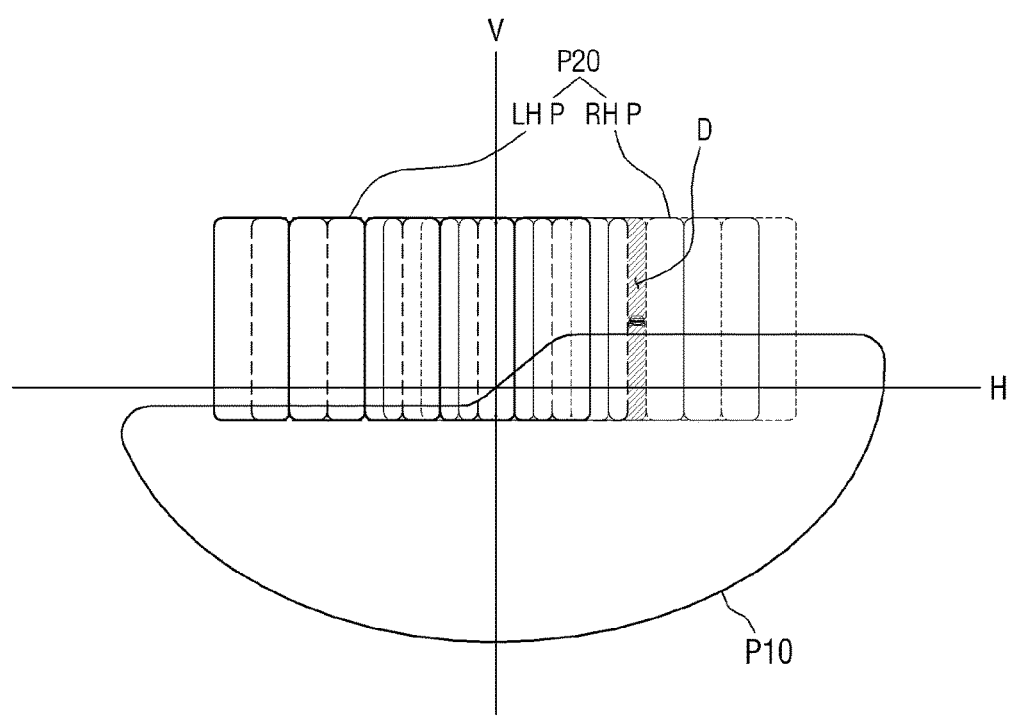

When the preceding or oncoming vehicle enters No. 20 partial pattern segment, No. 7 light source and No. 8 light source of the second lamp may be turned off or dimmed to form a corresponding segment (i.e., No. 20 partial pattern segment) as a dark zone D as illustrated in FIGS. 14 and 15. Additionally, when the preceding or oncoming vehicle enters No. 19 partial pattern segment, No. 6 light source and No. 7 light source of the second lamp may be turned off or dimmed to form a corresponding segment (i.e., No. 19 partial pattern segment) as a dark zone D as illustrated in FIGS. 16 and 17. For example, an overlap area between partial patterns formed by No. 6 light source and No. 7 light source of the second lamp which form No. 19 partial pattern segment may partially overlap a partial pattern formed by No. 1 light source of a first lamp, thereby forming a partial pattern segment in an irradiation range of 1 degree, unlike the previous No. 20 through No. 23 partial pattern segments.

As described above, a first light distribution pattern LH P formed by the first lamp and a second light distribution pattern RH P formed by the second lamp do not overlap each other on the outboard side. Therefore, partial patterns of the first and second light distribution patterns LH P and RH P which are located on the outboard may form a partial pattern segment. The preceding or oncoming vehicle entering the first and second light distribution patterns LH P and RH P from outside the first and second light distribution patterns LH P and RH P are located, as a dark zone D as corresponding light sources are turned on or off (e.g., dimmed). Conversely, the first light distribution pattern LH P formed by the first lamp and the second light distribution pattern RH P formed by the second lamp may overlap each other on the inboard side. Therefore, partial patterns of the first and second light distribution patterns LH P and RH P which are located on the inboard side may form a narrower partial pattern segment than the partial patterns located on the outboard side. The narrow partial pattern segment on the inboard side may also be formed as a dark zone D.

Figure 18:
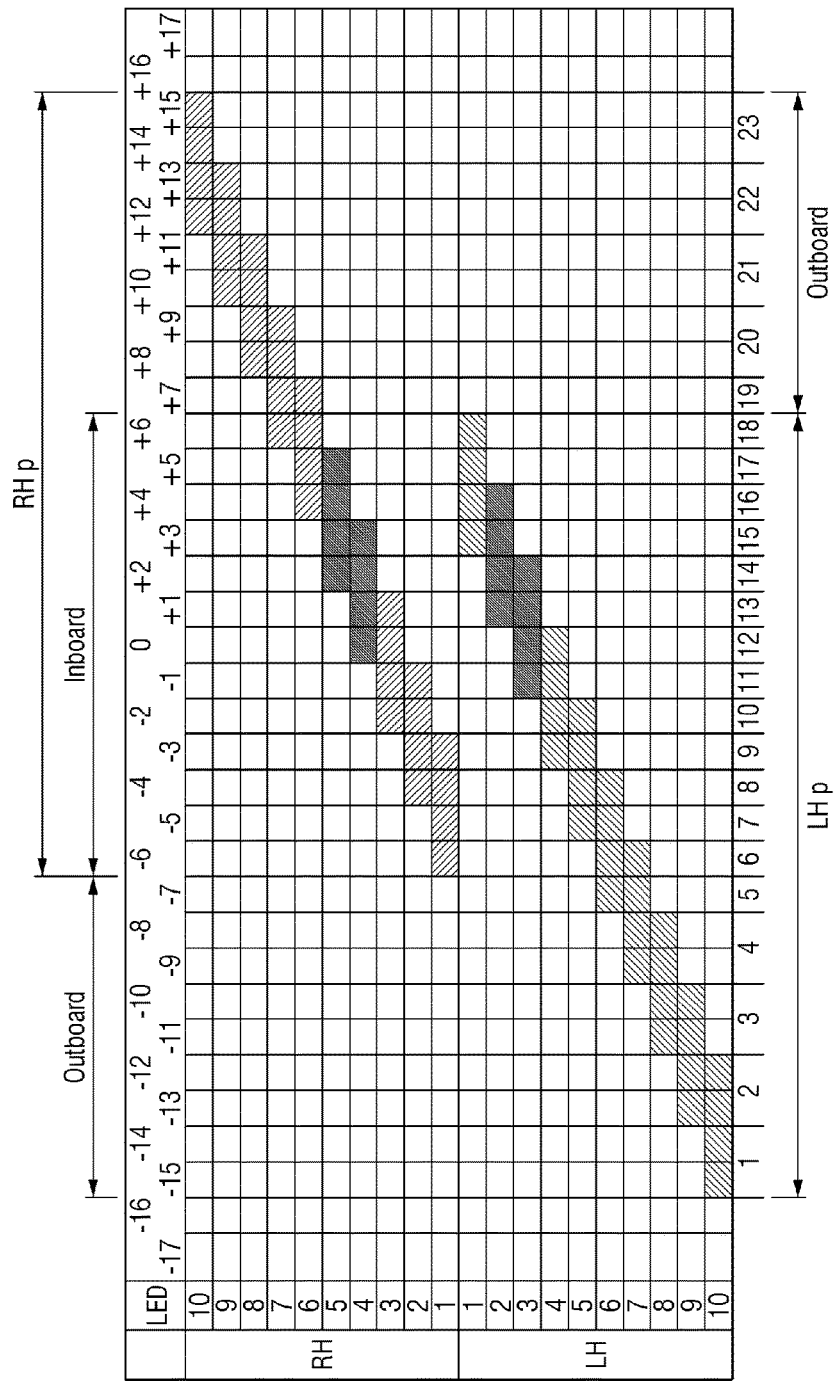
Figure 19:
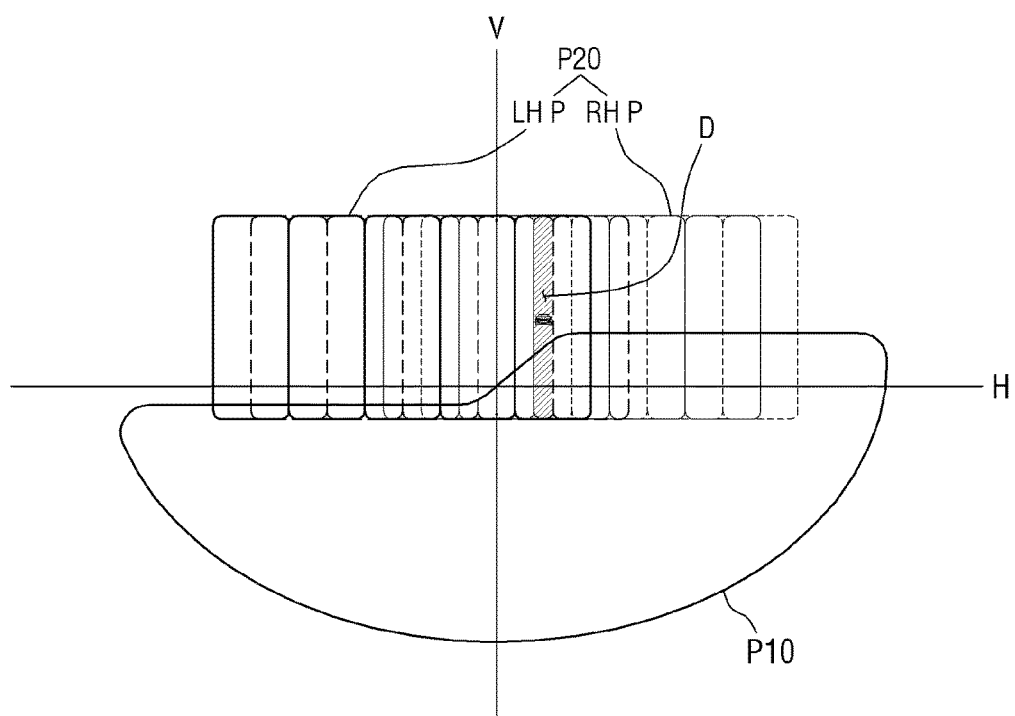
Figure 20:
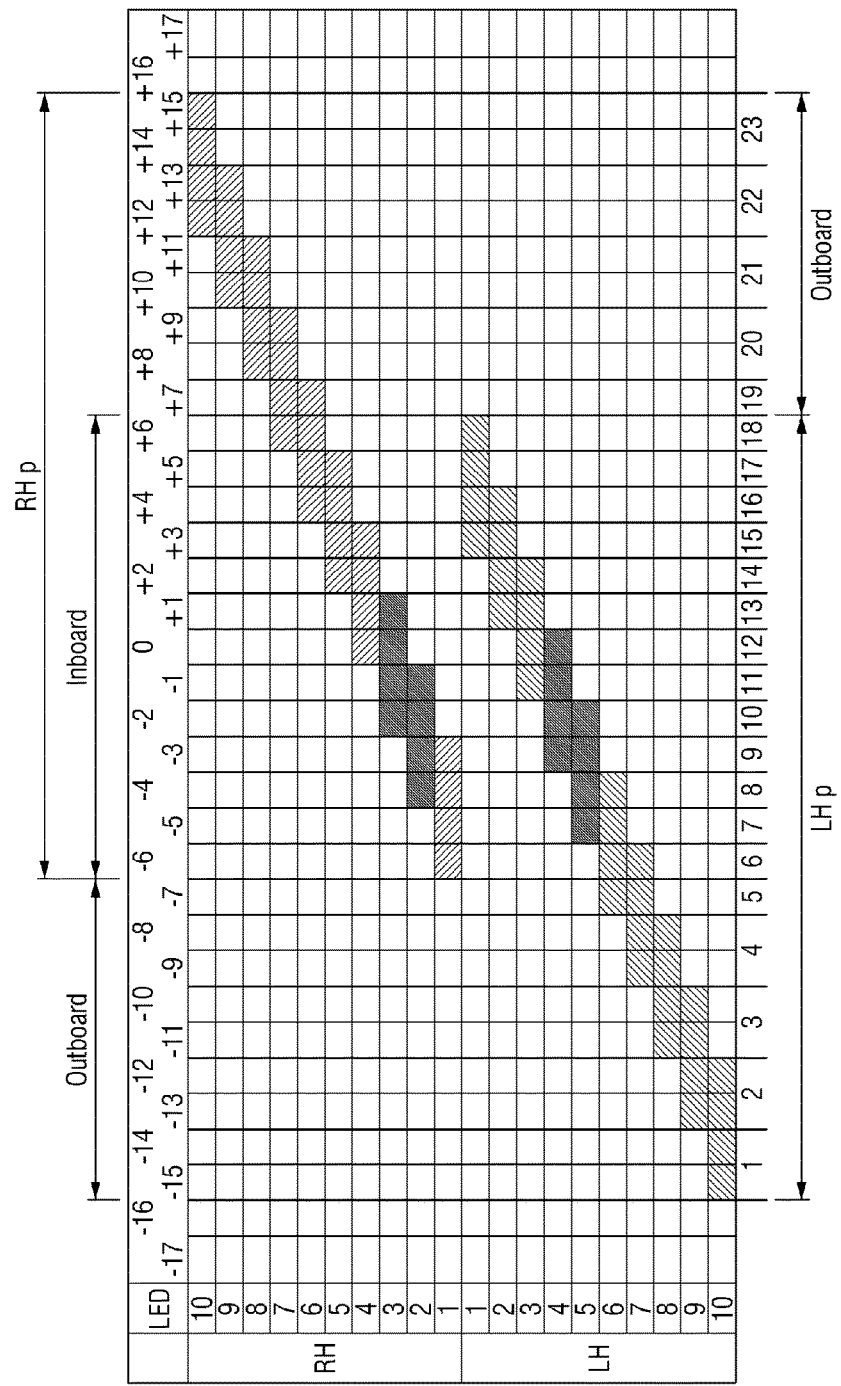
Figure 21:
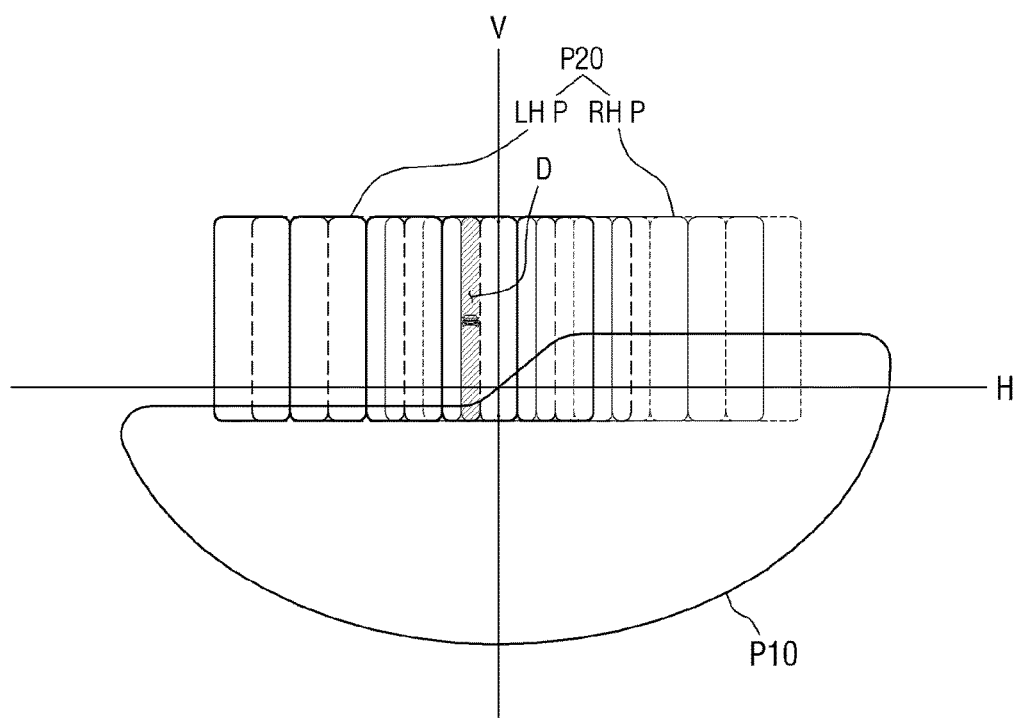

For example, when the preceding or oncoming vehicle is sensed to be located in No. 14 partial pattern segment on the inboard side, No. 4 light source and No. 5 light source of the second lamp may be turned off or dimmed, and No. 2 light source and No. 3 light source of the first lamp may be turned off or dimmed as illustrated in FIGS. 18 and 19. As a result, a corresponding segment (i.e., No. 14 partial pattern segment) may be formed as a dark zone D. In addition, when the preceding or oncoming vehicle is located in No. 10 partial pattern segment on the inboard side, No. 2 light source and No. 3 light source of the second lamp may be turned off or dimmed, and No. 4 light source and No. 5 light source of the first lamp may be turned off or dimmed as illustrated in FIGS. 20 and 21. As a result, a corresponding segment (i.e., No. 10 partial pattern segment) may be formed as a dark zone D.

As described above, of the first light distribution pattern LH P formed by the first lamp and the second light distribution pattern RH P formed by the second lamp, partial patterns located on the onboard side to overlap each other may form a partial pattern segment of a narrower range than a partial pattern segment formed by partial patterns located on the outboard side. Therefore, when corresponding light sources of the first lamp and corresponding light sources of the second lamp are controlled to be turned on or off, the partial patterns on the inboard side may form a narrower partial pattern segment as the dark zone D than the partial patterns located on the outboard side. Since the number of partial pattern segments that may be formed as dark zones is greater than the number of light sources, a dark zone may be formed only in a partial pattern segment in which a preceding or oncoming vehicle is located. Consequently, the formation of an unnecessary dark zone may be prevented. Each partial pattern segment on the inboard side located in a central part of a vehicle may include at least three partial patterns.

For example, referring to FIGS. 5 and 6, No. 6 partial pattern segment located at an outermost end of the inboard side may include three partial patterns respectively emitted from No. 6 light source p6 and No. 7 light source p7 of the first lamp 100a and No. 1 light source p1 of the second lamp 100b. Additionally, a partial pattern segment located in the middle of the inboard side may include four partial patterns emitted from two light sources of each of the first lamp and the second lamp. Conversely, a partial pattern segment located on the outboard side may generally include two partial patterns emitted from two light sources and a partial pattern segment located at an outermost end of the outboard side may include one partial pattern. In other words, the number of partial patterns included in a partial pattern segment may be gradually reduced toward the edge of the vehicle.

When a dark zone is formed in some partial pattern segments may be selected by the control of the ADB headlamp for a vehicle according to the exemplary embodiment. The partial patterns that form the boundary of the dark zone on both sides of the dark zone may be components of partial patterns which do not overlap other partial patterns. Therefore, since the partial patterns that form the boundary of the dark zone are relatively not bright, a smooth dark zone without a significant difference in illuminance may be formed. For example, when a preceding or oncoming vehicle is located in No. 14 partial pattern segment on the inboard side, No. 4 light source and No. 5 light source of the second lamp may be turned off or dimmed, and No. 2 light source and No. 3 light source of the first lamp may be turned off or dimmed as illustrated in FIGS. 18 and 19. As a result, a corresponding segment (i.e., No. 14 partial pattern segment) may be formed as a dark zone D.

For example, partial patterns that form the boundary of the dark zone D may be a part of a partial pattern emitted by No. 3 light source of the second lamp and a part of a partial pattern emitted by No. 1 light source of the first lamp. Since the part of the partial pattern emitted by No. 3 light source of the second lamp and the part of the partial pattern emitted by No. 1 light source of the first lamp may form the boundary of the dark zone D do not overlap other partial patterns, a smooth dark zone with relatively low illuminance may be formed. In other words, the part of the partial pattern emitted by No. 3 light source of the second lamp and the part of the partial pattern emitted by No. 1 light source of the first lamp which form the boundary of the dark zone D do not overlap other partial patterns because No. 4 light source and No. 5 light source of the second lamp are turned off or dimmed and No. 2 light source and No. 3 light source of the first lamp are turned off or dimmed. Therefore, a smooth dark zone with relatively low illuminance may be formed.

For example, while the ADB headlamp for a vehicle according to the exemplary embodiment has been described above using, as a representative example, a process in which a preceding or oncoming vehicle enters the second light distribution pattern RH P formed by the second lamp from the edge of the second light distribution pattern RH P. The same control described above may be applied to form a dark zone when a preceding or oncoming vehicle enters the first light distribution pattern LH P from the edge of the first light distribution pattern LH P. Thus, a repetitive description will be omitted.

When a partial pattern segment in which a sensed vehicle ahead, such as a preceding vehicle or an oncoming vehicle is located and selected to form the partial pattern segment as a dark zone, both the partial pattern segment in which the sensed vehicle ahead may be located and an adjacent partial pattern segment may be selected to form a dark zone when specific conditions are met. For example, the specific conditions may be conditions preset based on the speed of the vehicle being driven, the degree of handle manipulation, the speed of the sensed vehicle ahead, the location change rate of the sensed vehicle ahead, the distance between the vehicle being driven and the sensed vehicle ahead, or the surrounding environment.

Figure 22:
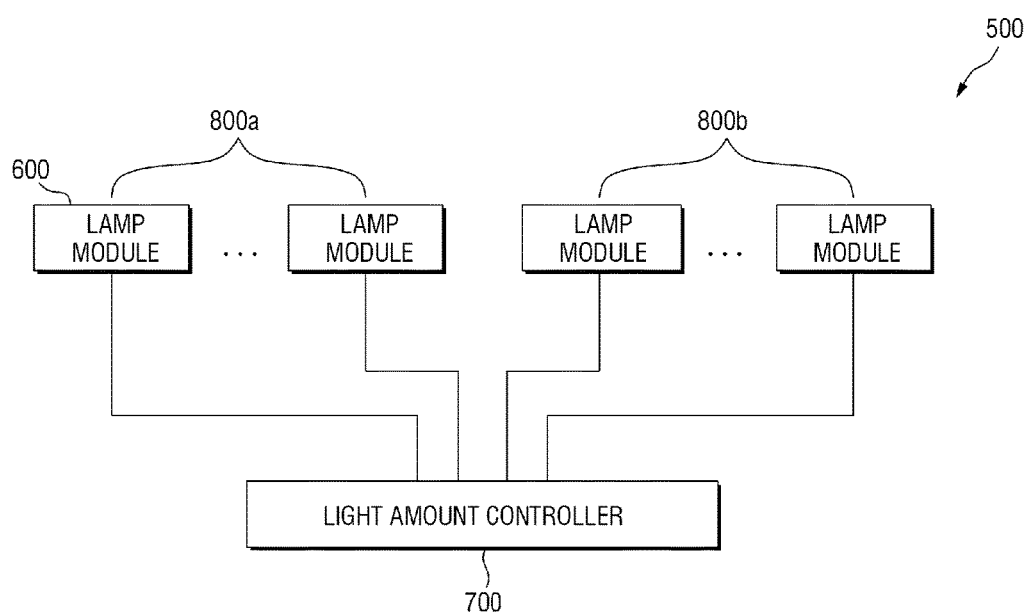
FIG. 22 illustrates a an exemplary ADB headlamp for a vehicle according to an exemplary embodiment.

FIG. 22 illustrates an ADB headlamp 500 for a vehicle according to an exemplary embodiment. The ADB headlamp 500 for a vehicle may include a first lamp 800a, a second lamp 800b, and a light amount controller 700. The first lamp 800a may include a plurality of light sources. Light emitted from each of the light sources may be included in the first lamp 800a to a first partial pattern and at least one of the first partial patterns overlaps an adjacent first partial pattern to form a first light distribution pattern. Likewise, the second lamp 800b may include a plurality of light sources. Light emitted from each of the light sources included in the second lamp 800b may form a second partial pattern and at least one of the second partial patterns may overlap an adjacent second partial pattern to form a second light distribution pattern. The light sources included in each of the first lamp 800a and the second lamp 800b may be included in lamp modules 600, respectively. Ultimately, each of the first lamp 800a and the second lamp 800b may be understood as including a plurality of lamp modules 600 having the light sources.

The lamp modules 600 secure a driver's night vision by irradiating light. A plurality of lamp modules 600 may be included in the ADB headlamp 500 for a vehicle. Some of the lamp modules 600 may be disposed at a front left side of a vehicle and the other lamp modules 600 may be disposed at a front right side of the vehicle. The first lamp 800a described above may be a group of lamp modules 600 disposed at the front left side of the vehicle and the second lamp 800b may be a group of lamp modules 600 disposed at the front right side of the vehicle.

The first lamp 800a may irradiate light to an area ahead of a left side of the vehicle, and the second lamp 800b may irradiate light to an area ahead of a right side of the vehicle. Alternatively, in some exemplary embodiments, at least some of the lamp modules 600 included in the first lamp 800a may irradiate light to the area ahead of the right side of the vehicle, and at least some of the lamp modules 600 included in the second lamp 800b may irradiate light to the area ahead of the left side of the vehicle. The description below will focus on the case where the first lamp 800a irradiates light to the area ahead of the left side of the vehicle and the second lamp 800b irradiates light to the area ahead of the right side of the vehicle. In addition, it will be assumed that a maximum amount of light of each lamp module 600 is equal.

The light amount controller 700 may be configured to operate the lamp modules 600. Specifically, the light amount controller 700 may be configured to adjust the magnitude (i.e., amount) of light irradiated by each lamp module 600. For example, the light amount controller 700 may adjust a specific lamp module 600 to irradiate a maximum amount of light and another specific lamp module 600 to irradiate about 70% of the maximum amount of light.

Figure 23:
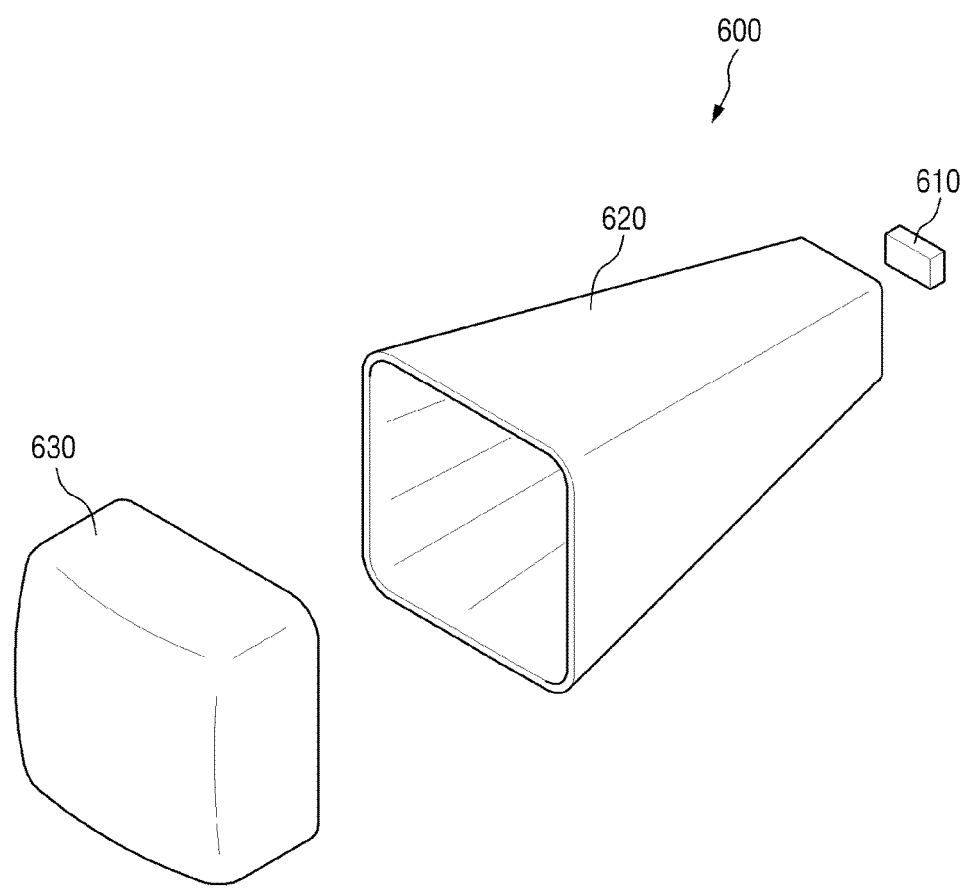
FIG. 23 illustrates an exemplary lamp module according to an exemplary embodiment.

The configuration and operation of the lamp modules 600 will now be described in detail. FIG. 23 illustrates a lamp module 600 according to an exemplary embodiment. The lamp module 600 may include a lens 630, a tunnel 620, and a light source 610. As a non-limiting example, the light source 610 may be a projection-type light source as a light-emitting module that may be configured to generate light. The projection-type headlamp may have a characteristic of concentrating light into one point and thus the projection-type head lamp may be advantageous in terms of the light distribution effects compared to a general clear type and may provide a sporty feeling to the front shape of a vehicle. As another non-limiting example, the light source 610 may include a discharge bulb and a light-emitting unit that may be emitted due to the discharge bulb and the discharge bulb may be a metal halide bulb.

The tunnel 620 guides light generated by the light source 610 toward an opening on a side of the tunnel 620. In other words, the tunnel 620 guides light emitted from the light source 610 to a desired location by reflecting the light. At this time, at least some of the light light of the light source 610 may be directly transmitted to the opening of the tunnel 620 without being reflected by the tunnel 200. The light source 610 may be provided at an end ("light incident end") located opposite the opening ("light emitting end") of the tunnel 620. The light source 610 may be provided within the interior or the exterior of the tunnel 620. When the light source 610 is provided on the exterior of the tunnel 620 the light incident end (e.g., the light emitting end) may be formed to have an opening or at least a part of the light emitting end may be enclosed by an appropriate light-transmitting material.

Hereinafter, the description will center on the case where the light source 610 is provided within the tunnel 620. A scattered layer or a spread layer may be formed on the surface of the interior of the tunnel 620. In other words, when light is emitted from the light source 610 the light may be scattered by the tunnel 620 and may then be emitted in an evenly distributed state through the lens 630 in the front. In particular, the light emitted through the lens 630 may show a distribution in which the overall luminance is uniform when the type in which the light is emitted from the surface light source. The scattered layer, formed on the inner surface of the tunnel 200, may include minute irregularities of a repeated form. The overall luminance may become uniform as the light emitted through the light emitting end of the tunnel 620 may be irregularly reflected by the minute irregularities. The lens 630 projects light emitted through the opening (i.e., the light emitting end) of the tunnel 620. Further, the lens 630 refracts light generated from the light source 610 to be directed toward the front. To this end, the lens 630 may have a focal point as a convex lens or a concave lens.

Figure 24:
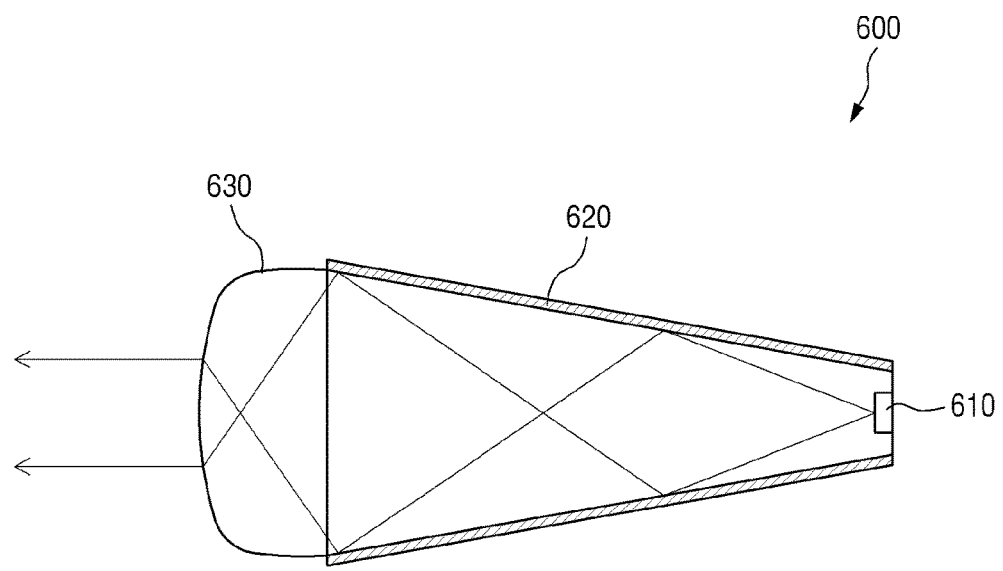
FIG. 24 illustrates an exemplary side surface of the lamp module of FIG. 23 according to an exemplary embodiment.

FIG. 24 illustrates a side surface of the lamp module 600 of FIG. 23. The light, generated from the light source 610 may be reflected in the inner surface of the tunnel 620 to be emitted through the lens 630. Further, though not illustrated in FIG. 24, the light generated from the light source 610 without being reflected on the inner surface of the tunnel 620 may be emitted directly through the lens 630. The cross-section of the light emitting end may be formed to be greater than the cross-section of the light incident end to transmit the light generated from the light source 610 to the light emitting end. In other words, the light generated from the light source 610 may be transmitted to the light emitting end with a less number of times of reflection and thus the light loss due to the reflection may be reduced.

Further, FIG. 24 illustrates that the interior surface of the tunnel 620 may be a straight line type but the inventive concept is not limited thereto. For example, it may have a curvature (e.g., concave or convex). In other words, the distribution pattern of light emitted from the light emitting end may be changed based on the curvature of the interior surface of the tunnel 620 and various beam patterns may be formed. In particular, the description below below focuses on the case when the inner surface is a straight line type, but it should be noted that the exemplary embodiment is not limited thereto. In FIGS. 23 and 24, the tunnel 620 may be shaped like a quadrangular pyramid and thus the cross-section of the lens 620 which contacts the light emitting end may be shaped like a quadrilateral. However, this is merely an an example, and the tunnel 620 may also be shaped like a polypyramid, such as a triangular pyramid or a pentagonal pyramid, or a cone.

Figure 25:
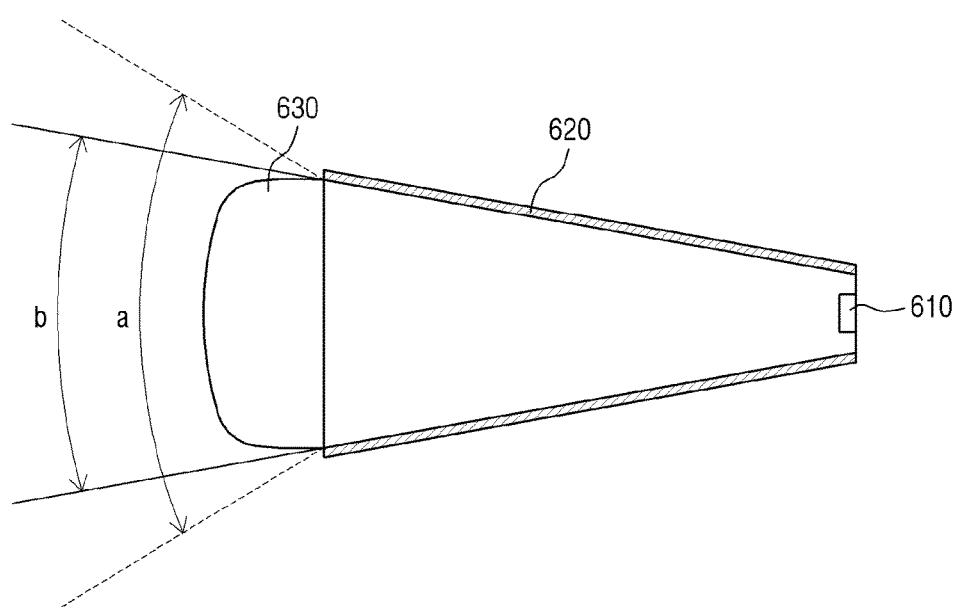
FIG. 25 illustrates an exemplary light irradiated from the lamp module of FIG. 24 according to an exemplary embodiment.

FIG. 25 illustrates light irradiated from the lamp module 600 of FIG. 24. Light generated from the light source 610 may be reflected on the interior surface of the tunnel 620 and may then be emitted to the light emitting end. Here, the diffusion range of the emitted light may be determined based on the lastly reflected angle. The diffusion range may be changed based on the distance between the light incident end and the light emitting end, the difference of the sizes of the cross-sections between the light incident end and the light emitting end and the curvature of the interior surface of the tunnel. The reference character "a" of FIG. 25 refers to a wide diffusion range. One of the purposes of the lamp module 600 of the inventive concept may be to secure the view on a specific point in the front. In particular, it is preferred to have a narrow diffusion range rather than a wide diffusion range. In other words, it is desirable to concentrate light on a specific point rather than irradiating light throughout a wide range. The lens 630 may refract light transmitted from the opening to be directed to a front side of the lens 630 to reduce the diffusion range. As a result, the light emitted from the lens 630 may be irradiated with a narrow diffusion range as shown in reference character "b" of FIG. 25, and the light may be irradiated toward a front side of the lens as shown in FIG. 24.

Figure 26:
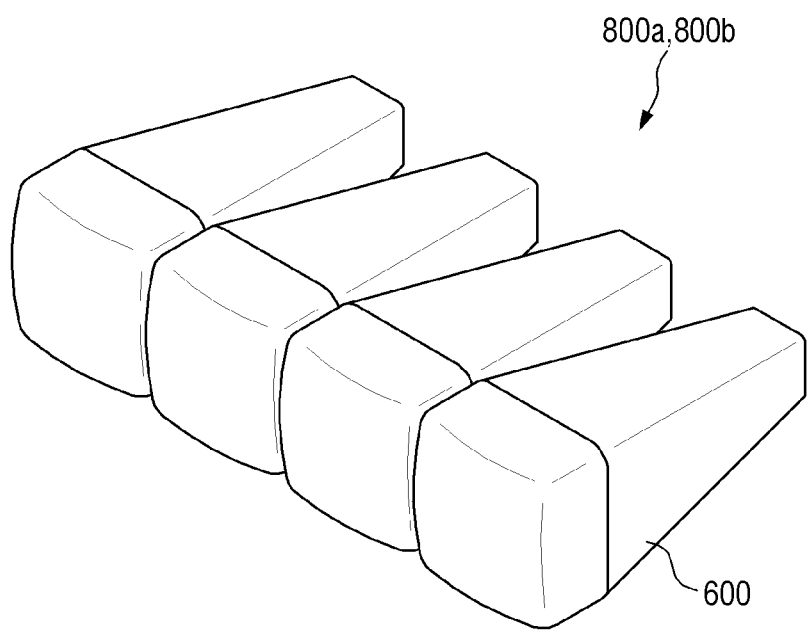
FIG. 26 illustrates an exemplary a lamp according to an exemplary embodiment.

FIG. 26 illustrates a lamp according to an exemplary embodiment. An ADB headlamp 500 for a vehicle of the inventive concept may include lamps 800a and 800b, each may include a plurality of lamp modules 600. As shown in FIG. 26, the lamp modules 600 may have a horizontal linear arrangement. Each of the lamp modules 600 included in each of the lamps 800a and 800b may be adjusted and as such, light may be set to be irradiated on a specific point or not be irradiated on a specific point. Irradiation of light on a specific point may be determined based on the result of sensing the front side of the lens and a sensing device (not shown) such as a camera or an ultrasonic transceiver may be provided.

Figure 27:
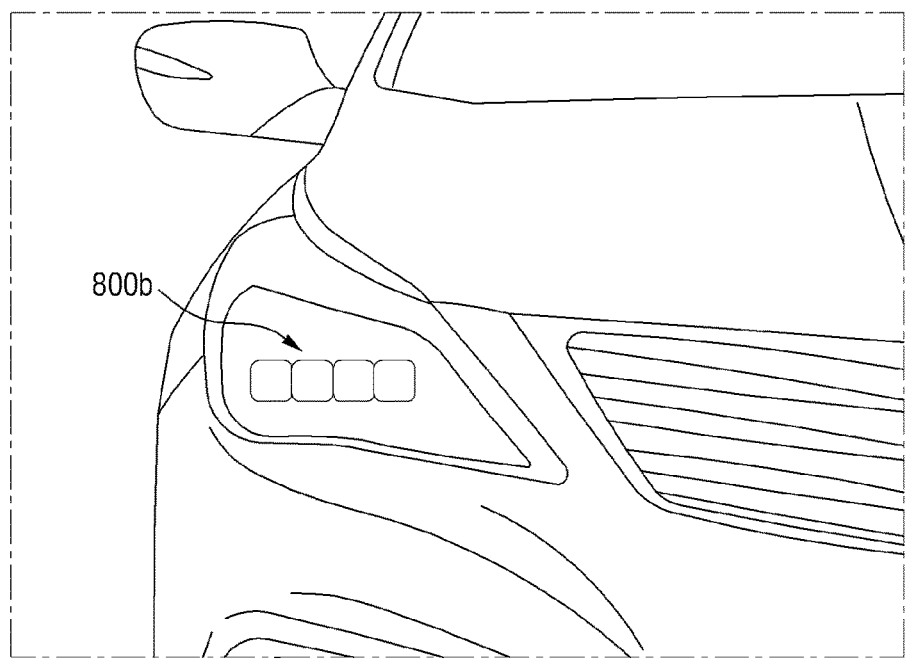
FIG. 27 illustrates an exemplary vehicle installed with the lamp of FIG. 26 according to an exemplary embodiment.

FIG. 27 illustrates a vehicle installed with the lamp of FIG. 26. Specifically, FIG. 27 illustrates the second lamp 800b viewed from the front of the vehicle. The lamps 800a and 800b may each include plurality of lamp modules 600 and may be arranged in front right and left sides of the vehicle. For example, various beam patterns may be formed by distinctively controlling the lamps 800a and 800b at both sides or controlling a lamp module 600 included in a specific lamp 800a or 800b.

Figure 28:
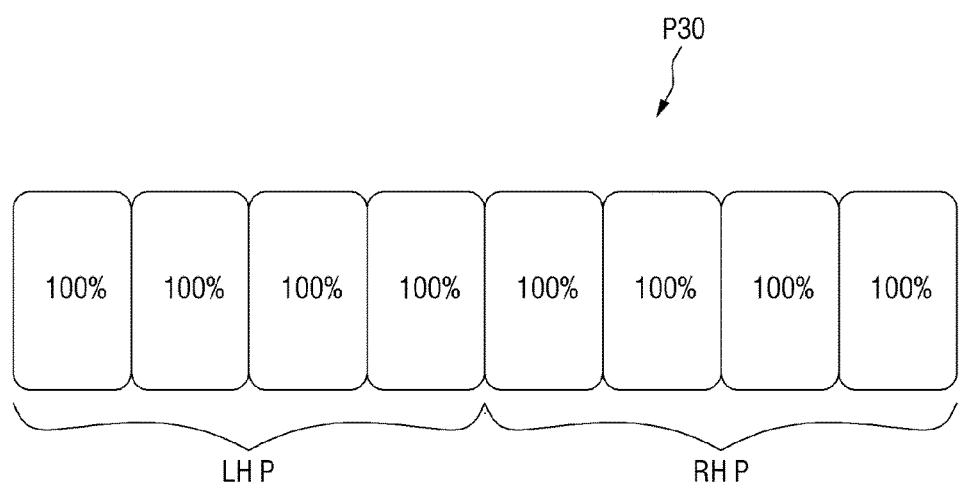
FIGS. 28 and 29 illustrate an exemplary light distribution pattern when the same amount of light is irradiated from the ADB headlamp for a vehicle according to the exemplary embodiment.
Figure 29:
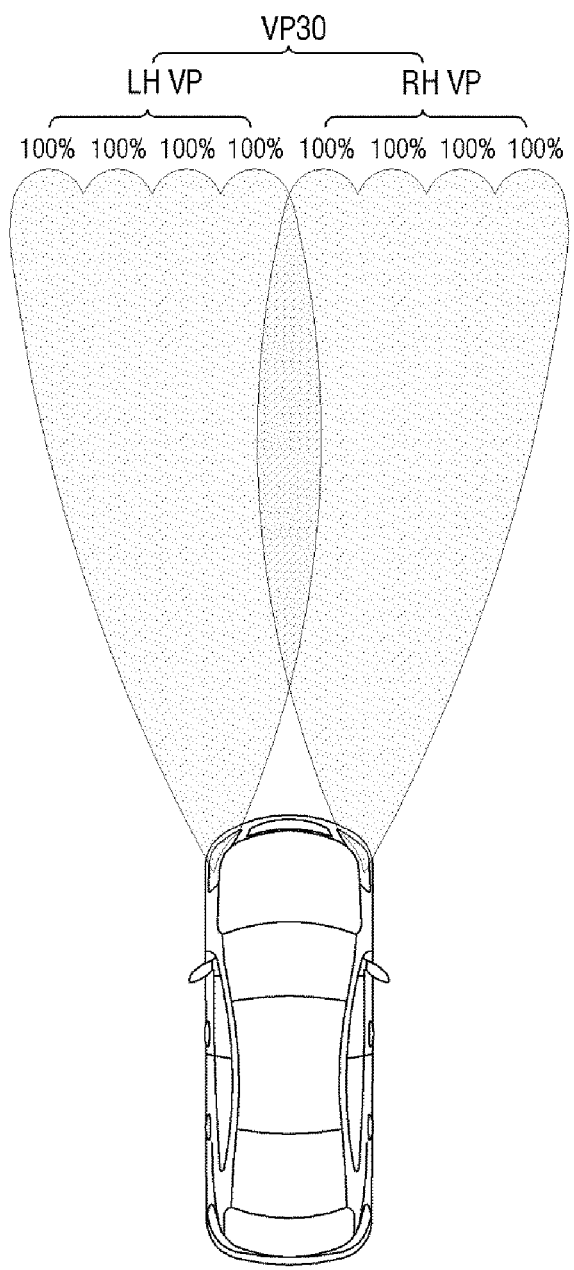

FIGS. 28 and 29 illustrate a light distribution pattern when the same amount of light is irradiated from the ADB headlamp for a vehicle according to the exemplary embodiment. As described above, the light irradiated from a lamp module 600 may have a narrow diffusion range. Accordingly, when the irradiated light is irradiated on a short distance screen a light distribution pattern having a certain area may be formed. Further, one lamp module may include a plurality light sources to irradiate a plurality of beams. For example, a light distribution pattern P30 including a plurality of light distribution pattern areas may be formed by each beam as in FIG. 28.

In particular, the description below will focus on the case where the number of the light distribution pattern areas and the number of the lamp modules are the same, but it should be noted that the inventive concept is not limited thereto. For example, 4 light distribution pattern areas may be formed by one lamp module, and 8 light distribution pattern areas may be formed by 4 lamp modules. Further, when there are a plurality of lamp modules, the numbers of light distribution pattern areas formed by respective lamp modules may be the same or different. Further, one lamp module may include a light source module including one or more LEDs. In other words, the lamp module may include a tunnel and a light source module including at least one LED. Alternatively, it may include a reflector and a light source module including at least one LED. Further, the lamp module of the inventive concept may be implemented as a projection type, a direct ray type, or a reflector type as well as a tunnel type and a multi focus reflector (MFR) type.

FIG. 28 illustrates a light distribution pattern P30 including a plurality of light distribution pattern areas. For example, four areas in the left side show partial patterns ("first partial patterns") by the first lamp 800a and four areas in the right side show partial patterns ("second partial patterns") by the second lamp 800b. At least one of the first partial patterns formed by the first lamp 800a may overlap an adjacent first partial pattern to form a first light distribution pattern LH P. Further, at least one of the second partial patterns formed by the second lamp 800b may overlap an adjacent second partial pattern to form a second light distribution pattern RH P.

The first light distribution pattern LH P formed by the first lamp 800a and the second light distribution pattern RH P formed by the second lamp 800b may at least partially overlap each other and may form the light distribution pattern P30. Therefore, while respective boundaries of the partial patterns meet each other in FIG. 28, some partial patterns may overlap adjacent partial patterns. Further, in FIG. 28, the value displayed at the interior of each partial pattern may show the amount of light that corresponds to each partial pattern. Likewise, when all partial patterns have the same amount of light, the road-surface light distribution pattern VP30 illustrated in FIG. 29 may be formed which may provide an unnatural view to the driver.

In other words, the most important part to the driver is the front of the vehicle, but because the same amount of light may be irradiated even to the side, the driver's eyes may be distracted. For example, when a driver is driving on a road where there are roadside trees, when the road-surface light distribution pattern VP30 as in FIG. 29 is formed, the light may be concentrated not only on the front, but also on the roadside tress. Accordingly, the driver's eyes may be directed to both the front of the vehicle and the roadside trees. Further, the road-surface light distribution pattern LH VP by the first headlamp 800a and the road-surface light distribution pattern RH VP by the second headlamp 800b may be similar, which may make the driver driving in the front or from the opposite direction uncomfortable.

Further, the roadside trees may be closer than the front side, which is the point of interest to the driver, from the driver's vehicle. In particular, more light may be irradiated on the roadside trees and thus the roadside trees may be brighter than the front of the vehicle. Additionally, in a lamp 800a or 800b for a vehicle including a plurality of lamp modules 600 which form a plurality of partial patterns, it may not be desirable to irradiate light so that the amounts of lights of all partial patterns become the same.

Figure 30:
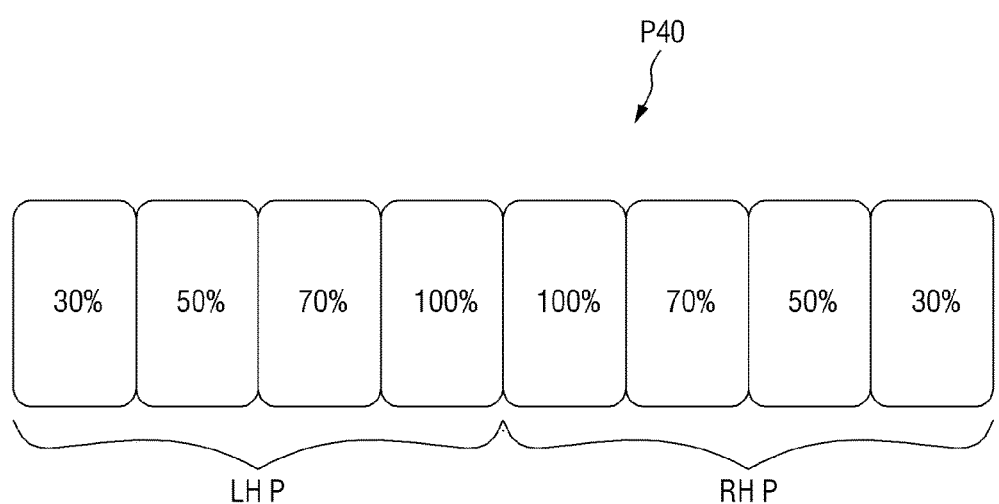
FIGS. 30 through 32 illustrate an exemplary light distribution pattern when the amount of light irradiated from the ADB headlamp for a vehicle according to the exemplary embodiment is adjusted.
Figure 31:
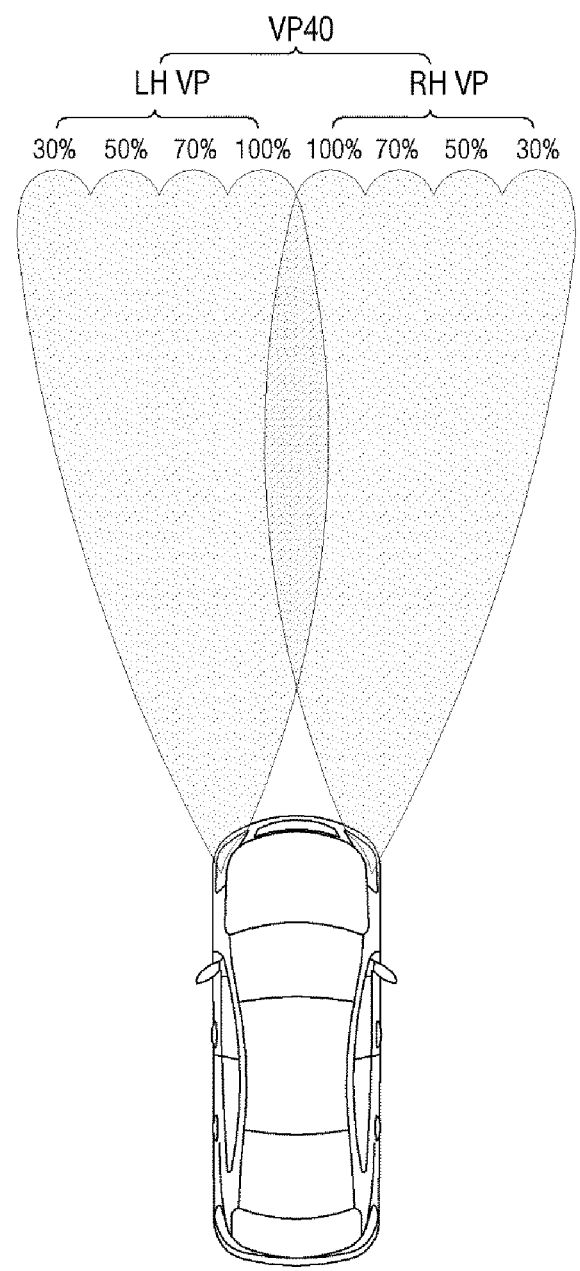
Figure 32:
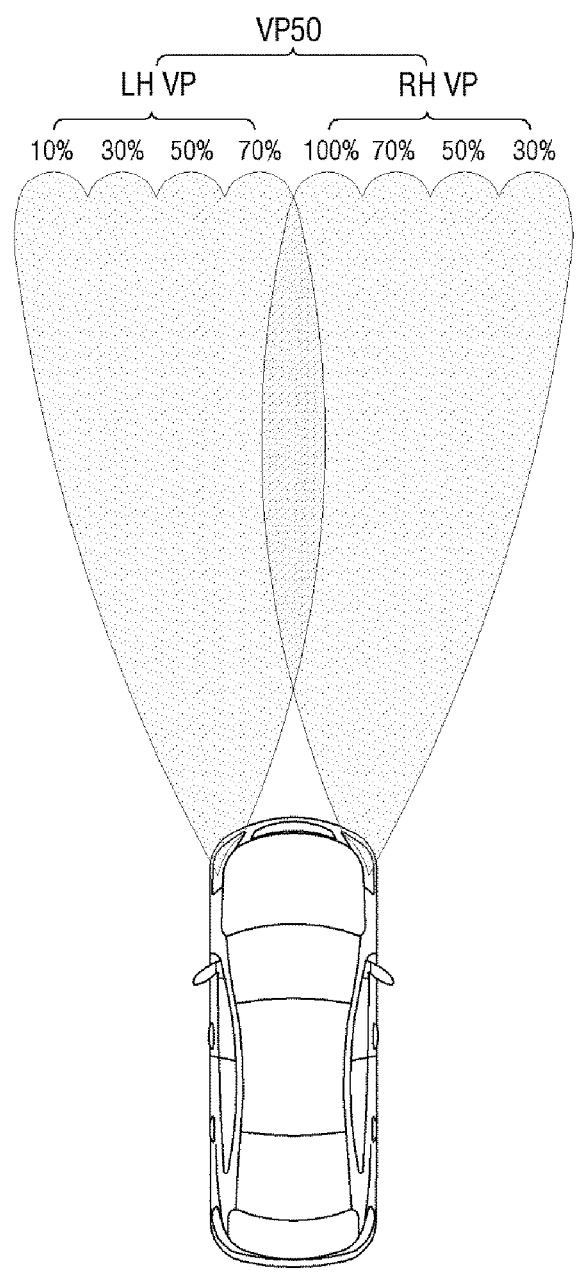
Figure 33:
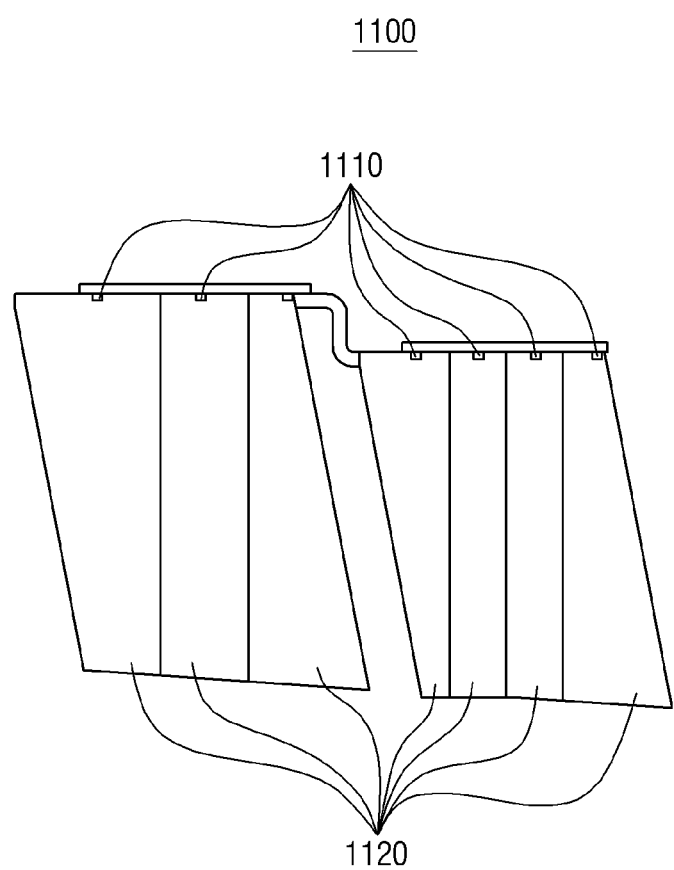
FIG. 33 illustrates an exemplary ADB headlamp for a vehicle according to an exemplary embodiment.

FIGS. 30 through 32 illustrate a light distribution pattern when the amount of light irradiated from the ADB headlamp for a vehicle according to the exemplary embodiment may be adjusted. FIG. 30 illustrates a light distribution pattern P40 when light by the lamp module 600 may be irradiated on a short distance screen. FIG. 31 illustrates a road-surface light distribution pattern VP40 that may be observed from the upper part of a vehicle.

As illustrated in FIG. 30, the amount of light of a plurality of partial patterns included in the light distribution pattern P40 according to an exemplary embodiment may not be the same and may have a certain pattern. In other words, the amount of light may decrease in the the direction from the center to the edge. In FIG. 30, 4 left areas show the partial patterns by by the first lamp 800a and 4 right areas show the partial patterns by the second lamp 800b. A A greater amount of light may be concentrated on the front compared to the sides of the vehicle. Accordingly, light reaches farther to the front and the transmission of light may be limited to the side of the vehicle. Further, the road-surface light distribution pattern VP40 that VP40 that includes a road-surface light distribution pattern LH VP in the left side and a road-surface light distribution pattern RH VP in the right side may be formed by different amounts of light as in FIG. 31.

The formation of a light distribution pattern may be performed by a light amount controller 700. The light amount controller 700 may be configured to operate a plurality of light sources 610 included in the first lamp 800a and a plurality of light sources 610 included in the second lamp 800b so that the amount of light in the central area of the width of a vehicle becomes greater than the amount of the edge area of the width of the vehicle. For example, the light amount controller 700 may be configured to adjust the first lamp 800a and the second lamp 800b to reduce the amount of irradiated light from the central area of the width of the vehicle toward the edge area.

FIG. 31 illustrates the road-surface light distribution patterns LH VP and RH VP by the first lamp 800a and the second lamp 800b. For example, the light amount controller 700 may be configured to separately operate the lamp module 600 in the first lamp 800a and the lamp module 600 in the second lamp 800b. Accordingly, the amount of irradiated light may gradually decrease in the direction from one side of each lamp module 600 to the other side. The light amount controller 700 of the inventive concept may be configured to adjust a lamp module according to a preset program or a user's command.

As the road-surface light distribution pattern VP40 as in FIG. 31 is formed, the front of a vehicle may become brighter than the side area and thus the driver's eyes are not distracted and the driver's eyes may be focused on the front of the vehicle. As described above, the light amount controller 700 may be configured to adjust the amount of light irradiated by headlamps at both sides by operation of the lamp module 600 which is provided at each of the headlamps at both sides of the vehicle. For example, the light amount controller 700 may be configured to adjust the first lamp 800a and the second lamp 800b to irradiate the same the amounts of light from the first and second lamps 800a and 800b. For example, as illustrated in FIGS. 30 and 31, the light amount controller 700 may be configured to operate each lamp module to form similar the light distribution patterns of the first lamp 800a and the second lamp 800b.

Further, when the road-surface light distribution pattern VP40 as in FIG. 31 is formed, the inconvenience to the driver driving in the front or driving from the opposite direction may be reduced. However, a light distribution pattern which more significantly reduces inconvenience may be formed. In other words, the light amount controller 700 according to the inventive concept may be configured to operate the first lamp 800*a* and the second lamp 800*b* to irradiate different amounts of light from the first lamp 800*a* and the second lamp 800*b* at both sides, thereby allowing formation of a light distribution pattern that may reduce light irradiated on the vehicles on the front and the vehicles from the opposite direction.

FIG. 32 illustrates a road-surface light distribution pattern VP50 when the amounts of light irradiated from a plurality of lamp modules are adjusted according to an exemplary embodiment and illustrates road-surface light distribution patterns LH VP and RH VP when the amount of light of the first lamp 800*a* may be adjusted to be less than the amount of light of the second lamp 800*b*. A light distribution pattern may be implemented to adjust only the average amount of light while applying the reduction ratio of the amount of light in the same manner. For example, as illustrated in FIG. 32, the amounts of light of the partial pattern by the lamp module of the first lamp 800*a* may be adjusted to about 10%, 30%, 50%, and 70%, and the amounts of light of the partial pattern by the lamp module of the second lamp 800*b* may be maintained at about 100%, 70%, 50%, and 30%. In particular, the overall average amounts become different while the reduction ratio of the amount of light in the first lamp 800*a* and the second lamp 800*b* is constant. Accordingly, the amounts of light become different while the light distribution pattern by the first lamp 800*a* and the light distribution pattern by the second lamp 800*b* have a similar form.

Alternatively, the light amount controller 700 may be configured to operate the lamp module to form various light distribution patterns. For example, the amounts of light of the partial pattern by the lamp module of the first lamp 800*a* may be uniformly adjusted to about 50% while the amount of light of the partial pattern by the lamp module of the second lamp 800*b* is maintained constant. The adjustment of the amount of light of the second lamp 800*b* may be performed along with the adjustment of the amount of light of the first lamp 800*a*. Further, the light amount controller 700 may turn on only specific partial patterns and turn off the others so that light may be irradiated on a specific object in the front and turn off specific partial patterns and turn on the others so that light may not be irradiated a specific point.

An ADB headlamp according to an exemplary embodiment may include a reduced number of light sources by making adjacent ones of a plurality of partial patterns formed by beams emitted from a plurality of light sources partially overlap each other. Therefore, the ADB headlamp may be manufactured with reduced cost due to a reduction in the number of components. Additionally, an ADB headlamp according to an exemplary embodiment may form a light distribution pattern having more partial pattern segments than the number of light sources by making adjacent partial patterns partially overlap each other. Therefore, the ADB headlamp may prevent the formation of an unnecessary dark zone by forming a dark zone in an exact segment in which a preceding vehicle or an oncoming vehicle is located.

Further, an ADB headlamp according to an exemplary embodiment may form a dark zone whose boundary may smooth by adjacent partial patterns when a selected partial pattern segment is formed as the dark zone by making a plurality of partial patterns be irradiated to one partial pattern segment by making adjacent partial patterns partially overlap each other. However, the effects of the inventive concept are not restricted to the one set forth herein. The above and other effects of the inventive concept will become more apparent to one of daily skill in the art to which the inventive concept pertains by referencing the claims.

While the inventive concept has been particularly shown and described with reference to exemplary embodiments thereof, it will be understood by those of ordinary skill in the art that various changes in form and detail may be made therein without departing from the spirit and scope of the inventive concept as defined by the following claims. The exemplary embodiments should be considered in a descriptive sense only and not for purposes of limitation. The scope of the inventive concept is defined by the following claims, rather than than by the above-described detailed description. The meanings and scope of the claims, and and all modifications or modified shapes, which are derived from equivalent concepts should be understood as being included in the scope of the inventive concept.

What is claimed is:

1. An adaptive driving beam (ADB) headlamp for a vehicle, the headlamp comprising:
    a first lamp having a plurality of light sources; and
    a second lamp having a plurality of light sources,
    wherein adjacent light sources irradiate a plurality of partial patterns in the first lamp to partially overlap each other to form a first light distribution pattern,
    wherein adjacent light sources irradiate a plurality of partial patterns in the second lamp to partially overlap each other to form a second light distribution pattern, and
    wherein a first plurality of segments are formed from the plurality of partial patterns in the first lamp that include the partial patterns from adjacent light sources,
    wherein a second plurality of segments are formed from the plurality of partial patterns in the second lamp that include the partial patterns from adjacent light sources,
    wherein the first light distribution pattern formed by the first lamp and the second light distribution pattern formed by the second lamp at least partially overlap each other to form a combined light distribution pattern from the first and second light distribution patterns,
    wherein a partial pattern segment corresponds to the location of a sensed vehicle ahead is selected from the partial pattern segments.

2. The headlamp of claim 1, wherein the first light distribution pattern formed by the first lamp and the second light distribution pattern formed by the second lamp overlap each other on an inboard side of a vehicle and do not overlap each other on an outboard side of the vehicle.

3. The headlamp of claim 2, wherein the partial pattern located on the outboard side has width that is greater than a width of the partial pattern located on the inboard side.

4. The headlamp of claim 2, wherein the partial patterns gradually become wider toward the outboard side.

5. The headlamp of claim 2, wherein a gap between partial pattern segments of light distribution patterns on the inboard side is less than a gap between partial pattern segments of light distribution patterns on the outboard side such that the light distribution patterns on the inboard side are formed as a dark zone with a narrower range than the light distribution patterns on the outboard side.

6. The headlamp of claim 1, wherein each of the partial pattern segments include at least one partial pattern.

7. The headlamp of claim 1, wherein each of the partial pattern segments comprises at least three partial patterns in a central part of the vehicle and comprises a gradually reduced number of partial patterns toward an edge of the vehicle.

8. The headlamp of claim 1, wherein the number of the partial pattern segments is greater than the number of the light sources included in the first lamp and the second lamp.

9. The headlamp of claim 1, wherein, when the partial pattern segment corresponds to the location of the sensed vehicle ahead is selected to form the dark zone, an adjacent partial pattern segment is additionally selected when specific conditions are met.

10. The headlamp of clam 9, wherein the specific conditions comprise at least one of the speed of the vehicle being driven, the degree of handle manipulation, the speed of the sensed vehicle ahead, the location change rate of the sensed vehicle ahead, the distance between the vehicle being driven and the sensed vehicle ahead, and the surrounding environment.

11. The headlamp of claim 1, wherein the amount of light of the light distribution pattern is gradually reduced from the inboard side toward the outboard side.

12. The headlamp of claim 1, wherein the first light distribution pattern forms a first plurality of partial pattern segments greater than the number of light sources.

13. The headlamp of claim 1 wherein the second light distribution pattern forms a second plurality of partial pattern segments greater that the number of light sources.

14. An ADB headlamp for a vehicle, the headlamp comprising:
    a first lamp that includes a plurality of light sources;
    a second lamp that includes a plurality of light sources; and
    a light amount controller configured to operate the light sources included in the first lamp and the light sources included in the second lamp to provide the amount of light that is greater in a central area of a width of a vehicle than in an edge area of the width of the vehicle,
    wherein adjacent light sources irradiate a plurality of partial patterns in the first lamp to partially overlap each other to form a first light distribution pattern,
    wherein adjacent light sources irradiate a plurality of partial patterns in the second lamp to partially overlap each other to form a second light distribution pattern, and
    wherein a first plurality of segments are formed from the plurality of partial patterns in the first lamp that include the partial patterns from adjacent light sources, and
    wherein a second plurality of segments are formed from the plurality of partial patterns in the second lamp that include the partial patterns from adjacent light sources,
    wherein the first light distribution pattern formed by the first lamp and the second light distribution pattern formed by the second lamp at least partially overlap each other to form a light distribution pattern.

15. The headlamp of claim 14, wherein the light amount controller is configured to operate the first lamp and the second lamp to reduce the amount of light irradiated from the central area of the width of the vehicle toward the edge area of the width of the vehicle.

16. The headlamp of claim 15, wherein the light amount controller is configured to adjust the amounts of light irradiated from both sides of the front of the vehicle by operating the first lamp and the second lamp provided at both sides of the front of the vehicle, respectively.

17. The headlamp of claim 16, wherein the light amount controller is configured to operate the first lamp and the second lamp to irradiate similar amounts of light from both sides of the front of the vehicle.

18. The headlamp of claim 16, wherein the light amount controller is configured to operate the first lamp and the second lamp to irradiate different the amounts of light from both sides of the front of the vehicle.

19. The headlamp of claim 14, wherein each of the first lamp and the second lamp include a plurality of lamp modules having light sources, and each of the lamp modules include a light source module having a light emitting diode (LED).

20. The headlamp of claim 19, wherein each of the lamp modules include a tunnel which guides light emitted from the light source module to an opening on a side; and a lens which projects light emerging from the opening.

21. The headlamp of claim 20, wherein the lens refracts the light emerging from the opening to reduce a diffusion range of the light that is projected.

22. The headlamp of claim 19, wherein each of the lamp modules include a reflector which reflects light from the light source module in a forward direction, wherein the reflector comprises a plurality of light reflecting units which reflect light to a specific point.

23. An adaptive driving beam (ADB) headlamp for a vehicle, the headlamp comprising:
    a first lamp having a plurality of light sources; and
    a second lamp having a plurality of light sources,
    wherein adjacent light sources irradiate a plurality of partial patterns in the first lamp to partially overlap each other to form a first light distribution pattern,
    wherein adjacent light sources irradiate a plurality of partial patterns in the second lamp to partially overlap each other to form a second light distribution pattern,
    wherein the first light distribution pattern forms a first plurality of partial pattern segments greater than the number of light sources,
    wherein the second light distribution pattern forms a second plurality of partial pattern segments greater that the number of light sources,
    wherein the first light distribution pattern formed by the first lamp and the second light distribution pattern formed by the second lamp at least partially overlap each other to form a combined light distribution pattern from the first and second light distribution patterns,
    wherein the first light distribution pattern forms a first plurality of segments greater than the number of light sources, and
    wherein the second light distribution pattern forms a second plurality of segments greater that the number of light sources.

* * * * *